United States Patent [19]

French et al.

[11] Patent Number: 5,526,204
[45] Date of Patent: Jun. 11, 1996

[54] LOW DRAG LIQUID BEARING RECORDING HEAD

[75] Inventors: William French, Cardiff; James U. Lemke, San Diego; Turguy Goker, Solano Beach, all of Calif.; Walter Wong; William Repphun, both of Boulder, Colo.; David P. Danson, Niwot, Colo.

[73] Assignee: Conner Peripherals, Inc., San Jose, Calif.

[21] Appl. No.: 396,273

[22] Filed: Feb. 28, 1995

Related U.S. Application Data

[63] Continuation of Ser. No. 976,442, Nov. 13, 1992, abandoned, which is a continuation-in-part of Ser. No. 810,955, Dec. 19, 1991, which is a continuation of Ser. No. 453,312, Dec. 20, 1989, Pat. No. 5,097,368.

[51] Int. Cl.$^6$ ........................................ G11B 5/60
[52] U.S. Cl. ........................... 360/97.02; 360/103
[58] Field of Search ..................... 360/97.02, 97.01, 360/102–104

[56] References Cited

U.S. PATENT DOCUMENTS

| | | | |
|---|---|---|---|
| 3,516,081 | 6/1970 | Horsfall et al. | 360/97.02 |
| 3,939,495 | 2/1976 | Nagai et al. | 360/103 |
| 4,681,447 | 7/1987 | Davidson | 356/351 |
| 4,757,402 | 7/1988 | Mo | 360/103 |
| 4,901,185 | 2/1990 | Kubo et al. | 360/104 |
| 5,025,335 | 6/1991 | Stefansky | 360/97.01 |
| 5,097,368 | 3/1992 | Lemke et al. | 360/97.02 |
| 5,193,046 | 3/1993 | Lemke et al. | 360/102 X |
| 5,202,803 | 4/1993 | Albrecht et al. | 360/97.02 |

FOREIGN PATENT DOCUMENTS

| | | |
|---|---|---|
| 0367510 | 5/1990 | European Pat. Off. . |
| 61-48182 | 3/1986 | Japan ........ 360/103 |
| 63-96722 | 4/1988 | Japan ........ 360/103 |

OTHER PUBLICATIONS

"Estimation of the Zero-Spacing Error Due to a Phase Shift of Reflected Light in Measuring a Magnetic Head Slider's Flying Height by Light Interference," by Fumitaka Muranushi, Katsuyuki Tanaka, Yashinori Takeuchi, published in Advances in Information Storage Technology, vol. 4, edited by Bharat Bhushan, published Oct. 1992 by ASME Press.

Chemical Engineer's Handbook, Fifth Edition, Robert H. Perry, et al., Editors, 1973, at pp. 5–38 through 5–40.

"A New Approach to Accurate Flying Height Measurements All the Way Down to Contact," by Dominic Veillard, Rigid Disk Head Media Tech. Newsletter, vol. 6, #2, Oct. 1992.

*Primary Examiner*—John H. Wolff
*Attorney, Agent, or Firm*—Fliesler, Dubb, Meyer & Lovejoy

[57] ABSTRACT

A read/write head for an information recording apparatus having a liquid bearing lubricant between a rotating storage medium and the read/write head is disclosed. The head is provided an actuator to position the read/write head over the rotating storage medium. The head includes a slider body having at least a first and second regions; and an interface element comprising a transducer interacting with the storage medium and mounted on the first region of the slider body. A relative motion exists between the head and the rotating storage medium and the slider body is supported by the liquid bearing lubricant during such motion, such that the first region of the slider body is supported at a first distance above the storage medium, and the second region of the slider body is supported at a second distance above the storage medium, whereby the first region of the slider body has a substantially higher drag than the second region when the head moves relative to the storage medium.

18 Claims, 17 Drawing Sheets

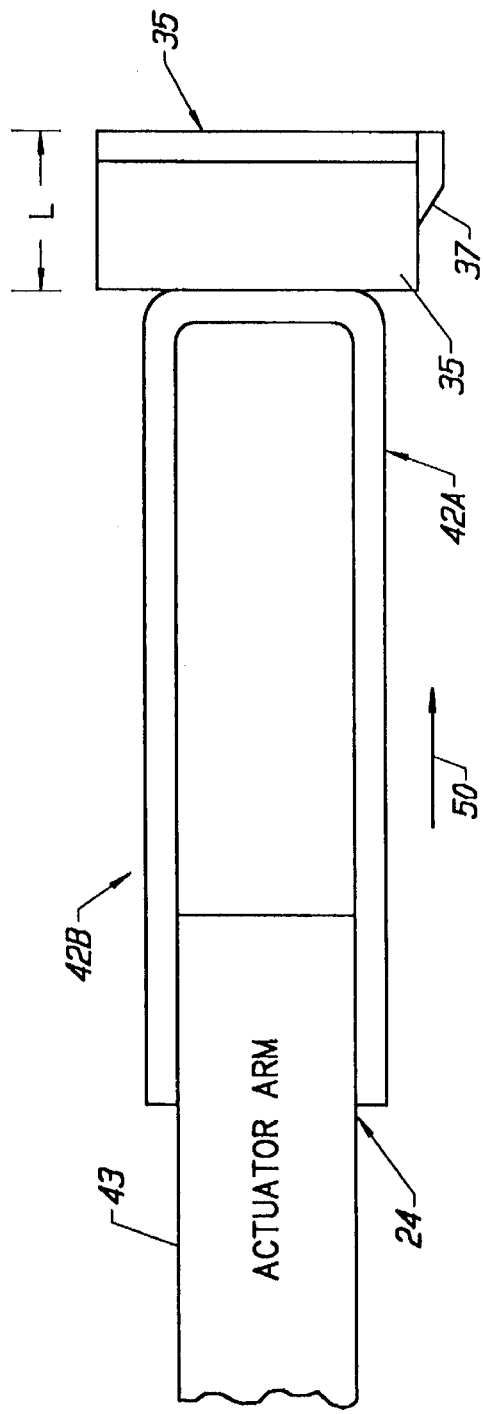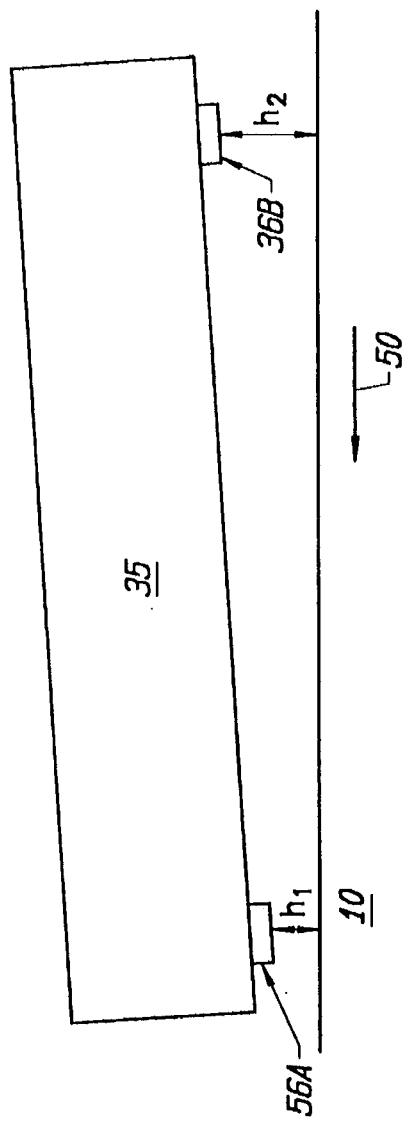

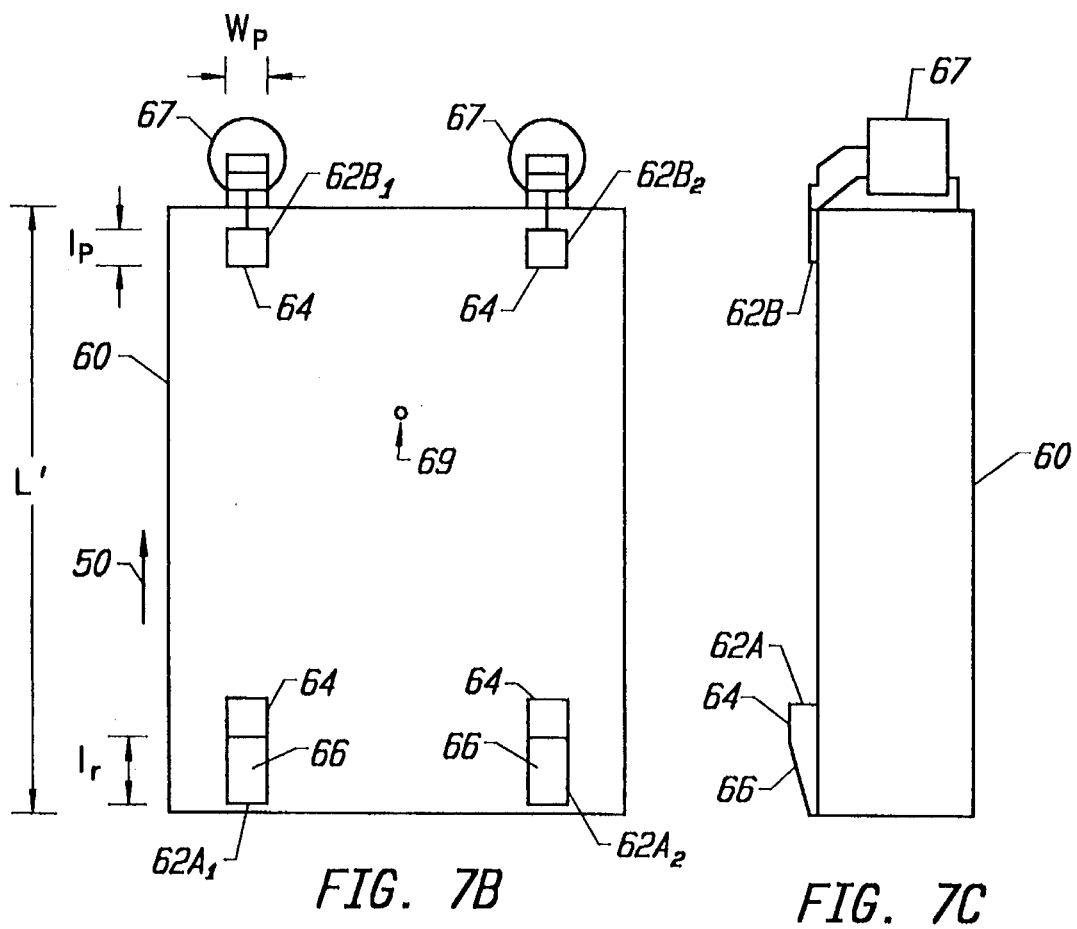
FIG. 7B
FIG. 7C
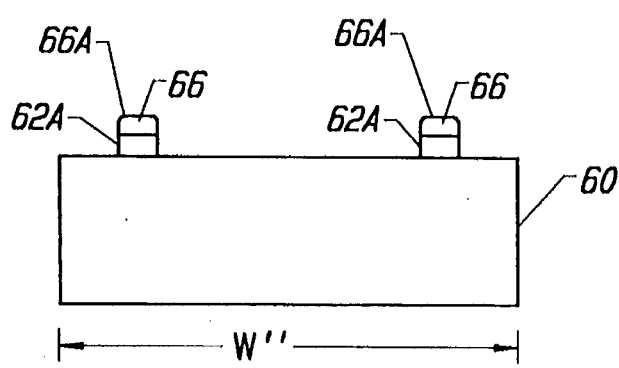
FIG. 7A

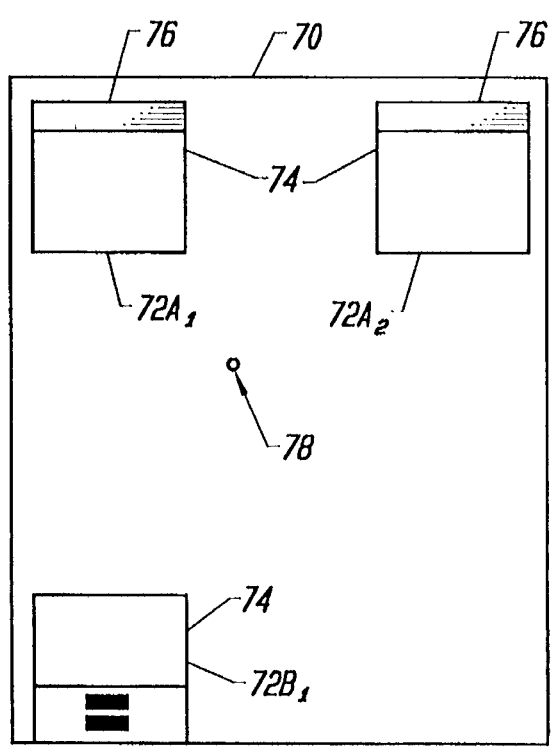
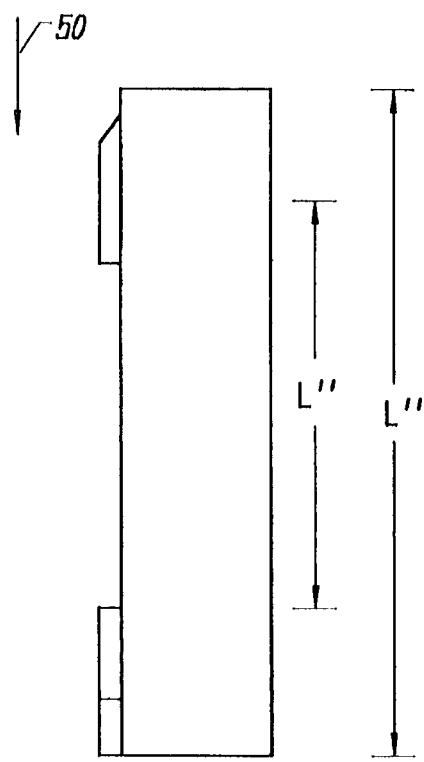
FIG. 8B
FIG. 8C
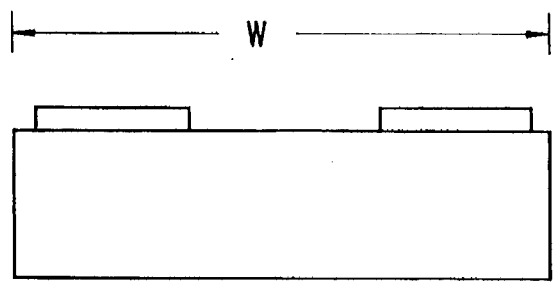
FIG. 8A

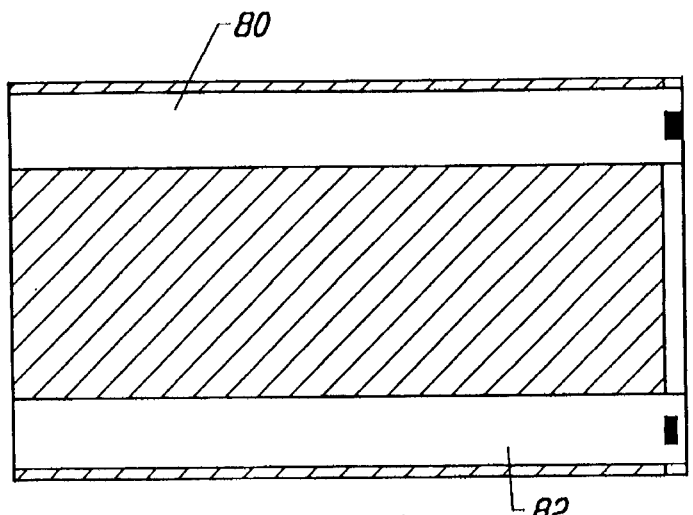
FIG. 14A
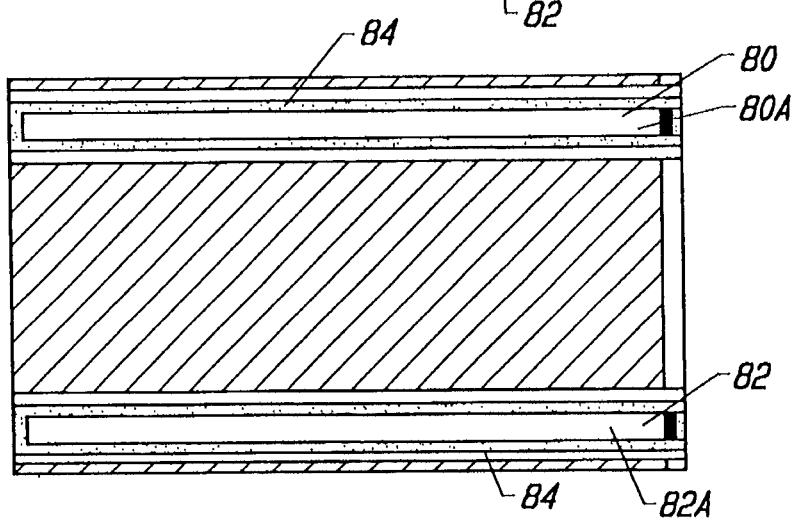
FIG. 14B
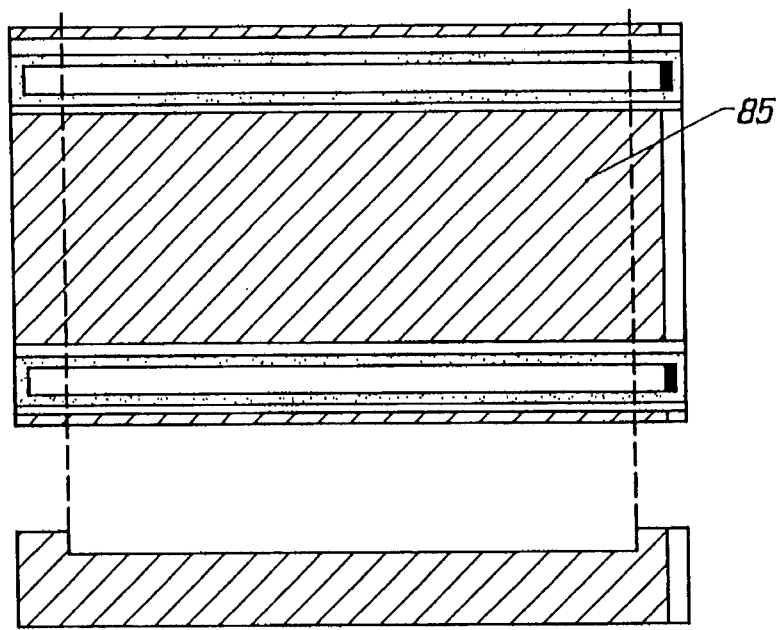
FIG. 14C
FIG. 14D

LOW DRAG LIQUID BEARING RECORDING HEAD

CONTINUING APPLICATION DATA

This application is a continuation of Ser. No. 07/976,442, filed Nov. 13, 1992, now abandoned, which is a continuation-in-part of application Ser. No. 07/810,955, entitled INFORMATION RECORDING APPARATUS WITH A NON-NEWTONIAN LIQUID BEARING, inventors Lemke, et al., filed Dec. 19, 1991, which is a continuation of application Ser. No. 07/453,312, filed Dec. 20, 1989, issued as U.S. Pat. No. 5,097,368, on Mar. 17, 1992.

CROSS-REFERENCE TO RELATED APPLICATIONS AND PATENTS

INFORMATION RECORDING APPARATUS WITH A LIQUID BEARING, inventors Lemke, et al., Ser. No. 07/590,608, filed Oct. 17, 1988 now U.S. Pat. No. 5,193,046.

WET RIGID DISK DRIVE ASSEMBLY WITH A CONICAL SPINDLE BEARING, Lemke, et al., Ser. No. 587,620, Feb. 24, 1989.

INFORMATION RECORDING APPARATUS WITH A NON-NEWTONIAN LIQUID BEARING, application Ser. No. 07/810,955, inventors Lemke, et al., filed Dec. 19, 1991, which is a continuation of application Ser. No. 07/453,312, filed Dec. 20, 1989, issued as U.S. Pat. No. 5,097,368, on Mar. 17, 1992.

LUBRICATED DISK DRIVE, Repphun, et al., Ser. No. 07/976,1998, filed Nov. 13, 1992, assigned to the assignee of the present application.

These applications and patents are hereby specifically incorporated by reference.

BACKGROUND OF THE INVENTION

1. Field of Invention

The invention relates to interactive elements commonly used in recording data on storage media in information storage devices. Specifically, the invention relates to a head design for use with recording an information apparatus utilizing a liquid bearing between the interactive element head and the storage disks.

2. Description of the Related Art

Designers of information storage technology constantly seek to improve data storage capacity and performance of information storage devices. In one aspect, this involves improving the relationship between an interactive element and the storage medium.

In Winchester-type magnetic storage devices, the interactive element is a read/write head which interacts with a magnetic storage disk. The read/write head is generally comprised of an active element, such as a transducer, mounted on a slider. Although continual contact between the interactive element and the magnetic storage medium is advantageous from a magnetic perspective, such arrangement is undesirable because wear and material interactions lead to degraded system reliability and performance. Accordingly, one paramount consideration in designing magnetic recording systems is the maintenance of spacing between the head and medium. In conventional drives, the read/write head "flies" over the disk-shaped recording medium by compressing a fine layer of air to form a very low friction gas bearing that maintains the head above, and out of contact with, the recording medium. The head-disk interface distance or "flying height" is determined by such factors as the shape, load and size of the head.

The read/write head itself generally includes a transducer element to read and write flux transitions into the magnetic material of the recording medium. Data is stored on the medium by the fringing magnetic field of the transducer element, generally a coil surrounding an active core providing two magnetic poles separated by a non-magnetic gap which is preferably oriented perpendicular to the disk surface. It is desireable to reduce the flying height of the recording head to increase the field gradient of the fringing flux of the transducer element incident to the storage medium and to increase the flux from the medium which reaches the head during playback.

FIGS. 1 and 2 illustrate, in general form, the interaction between a conventional air bearing read/write head and a magnetic storage disk, and a conventional air bearing read/write head design, respectively. The interface between a rigid disk medium 10 and a transducer 21, mounted on a slider 22, is maintained in an assembly including a means for rotating the disk 10, the means including a spindle 12 which fits through a central circular hole in the middle of the disk 10, and a spindle rotator 14. Slider 22 is normally loaded by application of a force applied to slider 22 and directed toward disk 10. The force is applied by an assembly including actuator 16 swing arm 18, and gimballed spring suspension mechanism 20. The actuator pivots swing arm 18 to selectively position transducer 21 radially with respect to disk 10. Gimballed spring suspension mechanism 20 loads slider 22 against disk 10 when disk 10 is stationary. When disk 10 rotates, an air bearing is generated which counter-loads slider 22, lifting and maintaining slider 22 and transducer 21 above the surface of disk 10 to a flying height. The spacing between transducer 21 and the surface of disk 10 is generally determined by the amount of loading exerted on slider 22, by the spring suspension, the aerodynamic design of slider 22 and the rotational velocity of the disk. It is to be understood that FIG. 1 is representative of the minimum complement of parts used to establish the operational interface between transducer 21 and disk 10. In fact, a headdisk assembly normally makes provision for a plurality of parallel-spaced, coaxial disks which rotate on a common spindle together with a ganged array of transducer heads controlled by one or more actuator assemblies.

While the disk rotates, conventional means, not shown, are used to operate the transducer 21 to electromagnetically read signals from, or write signals to, the disk. For this purpose, the transducer includes a wound core with a recording gap. Each head is thus comprised of two major parts: the slider, which provides the air bearing surface; and the transducer element, usually comprising a coil winding and recording gap, with the coil coupled to the control electronics of the disk drive with recording of data generated by the flux changes inducing magnetic changes in the recording medium. Rails, ramps and/or pads are incorporated onto the bottom portion of the slider to optimize flight characteristics for the head. The transducer is generally positioned at the trailing edge of the slider relative to the motion of the slider with respect to the disk.

FIG. 2 illustrates a typical prior art read/write head support structure. Slider 22 is suspended on a gimbal 24, which allows slider 22 to be parallel to disk 10 in response to forces applied to the slider in directions normal to disk 10, while preventing lateral motion and yaw of the slider.

Slider 22 includes a pair of elongated rails 23, each with a flat bearing surface. A narrow middle rail 25 is provided, also with a flat surface. The leading edges of side rails 23 are beveled at 27, as is the leading edge of the center rail at 29. Transducer 21 is mounted on slider 22 to place the recording gap 30 near the trailing edge of center rail 25, while transducer windings 32 are positioned below the recording gap on the trailing edge of the slider assembly beneath an anterior extrusion of center rail 25. When disk 10 rotates, a layer of air (the "air bearing") builds up at the interface between the slider of FIG. 2 and disk 10. The built-up layer of air reverse loads the slider on the flat bearing surfaces of rails 23, lifting the slider off of, or away from disk 10. When the disk achieves its operational rotational velocity, the slider of FIG. 2 is borne on the counter-loading layer of air, which now functions as a bearing in supporting the slider during relative motion between it and disk 10. When rotation of the disk ceases, the flow of air between the slider and the disk ceases removing the counter-loading force on the slider and permitting it to contact the surface of disk 10.

In addition to the three-rail slider shown in FIG. 2 the art also encompasses other slider configurations, some of which eliminate the center rail and place the electromagnetic transducer element in one of the two laterally spaced slider rails 23.

An alternative air bearing design utilizing "feet" or pads is shown in U.S. Pat. No. 4,757,402, issued to Mo. In order to reduce the effects of relative air motion on the flying height of the slider, a plurality of head designs having one, two, four or six cylindrically-shaped pads are shown. Notably, this design eliminates a "railed" configuration altogether in favor of the cylindrical pads.

Co-pending U.S. patent application Ser. No. 07/590,608 and U.S. Pat. No. 5,097,368, teach data storage devices utilizing a liquid bearing lubricant at the head-disk interface to reliably achieve a lower flying height than possible with an air bearing interface. In particular, a liquid bearing interface, having non-Newtonian characteristics with respect to the relationship between the shear stress and shear rate is utilized in a disk drive storage device to achieve flying heights on the order of $1\mu$" or less. Under conditions encountered in operation in a liquid disk drive, the liquid is subjected to a shear rate which is high enough to cause its viscosity to depend on shear rate. Viscosity is defined as the proportionality constant between shear stress (F/A) and the velocity gradient. This relationship is symbolized by equation (1), wherein:

$$F/A = u \, dv/dy \qquad (1)$$

where F is the force exerted on a stationary plate having a face with an area A by a parallel plate moving at a velocity v and spaced from the face at a distance (i.e., head-to-disk spacing) y by a liquid of viscosity u. For small y, the shear rate dv/dy is linear with y, and is v/y. When u is a constant, the liquid is said to be Newtonian, and the classical equation of hydrodynamics, the Navier-Stokes equation, is valid. The Navier-Stokes equation is not valid for any fluid that departs from constant u; in particular, the equation is not valid for fluids that depart so far from the constant as to be called "pseudo-plastic" or "plastic." FIG. 3 illustrates the relationship of Newtonian and pseudo-plastic and plastic liquids.

For definition and explanation of non-Newtonian fluid flow, reference is made to the Chemical Engineer's Handbook, Fifth Edition, Robert H. Perry, et al., Editors, 1973, at pp. 5–38 through 5–40.

FIG. 3 illustrates the shear stress of a liquid as a function of time rate of deformation of the liquid (shear rate). In FIG. 3, the shape of each curve directly represents the change in viscosity of the liquid. The curve labeled "Newtonian" shows a constant viscosity of a value corresponding to the slope of the curve. The curves labeled "pseudo-plastic" and "plastic" indicate liquids whose viscosity apparently decreases with an increase in shear rate.

The plastic or pseudo-plastic nature of the liquid bearing is important since it allows very small power dissipation in the head-disk interface at the speeds and small spacings necessary for a very high density of information storage on the disk.

In this regard, the power dissipated at the interface between the head and disk is given by equation (2), wherein:

$$P = Fv. \qquad (2)$$

From equations (1) and (2), it is possible to calculate the drag force on a head, and the power dissipated in rotating a disk when the liquid bearing material is a Newtonian fluid. The drag force on the head in shearing liquid, assuming the fluid to be Newtonian, would be:

$$F = Auv/y.$$

As noted in the '368 patent, the force and power necessary for a non-Newtonian plastic or pseudo-plastic liquid are over an order of magnitude less than required with a Newtonian liquid.

However, head drag is a problem unique to recording apparatus utilizing either a Newtonian or non-Newtonian liquid bearing. Drag is not a problem with air bearing heads because air imparts a drag of only 0.1 g or less on an air bearing head. However, head drag is a significant factor in the movement of the disk under a head with a liquid bearing between them. In particular, achieving a practical recording device utilizing a liquid bearing involves providing a interactive recording head wherein the drag is below a predefined minimum level in relation to the rotational speed of the disk. However, storage technology designers would like the power dissipated due to head drag in liquids to be even lower. Ideally, it is desireable to achieve a head design which would provide reduced drag when used in either a Newtonian or non-Newtonian liquid bearing.

One convenient measurement of the performance of a particular head used in a magnetic storage device is the time between the 50% amplitude points of a pulse signal applied to the head during write and read back during read (generally referred to as PW50). PW50 is an especially accurate reflection of the electrical performance of the head in terms of evaluating heads.

European Patent Application No. 0,367510, published Sep. 5, 1990, teaches a hard disk drive assembly using a low viscosity liquid lubricant on the disk surface to support the slider. Also shown therein is a slider configuration utilizing three triangular pads. One pad is positioned at the leading edge of the slider, while two pads are positioned adjacent the trailing edge of the slider. Each pad is positioned so that an included angle faces the leading edge of he slider, and one side is parallel to the "axis" of the slider. This "inclined" side, forming an angle of about 10° with the included angle, faces the outer edge of the slider with respect to the hub of the disk. It is noteworthy that the bottom surface of each of the pads is at a height of about 25–50 microns above the surface of the slider, and there is no teaching that these pads or any part of any of their surfaces be ramped, or angled with respect to the disk during operation. In addition, the drive assembly specifically requires that the bearing lubricant be maintained at a level of approximately one micron on the disk surface and should not exceed 5 microns (39.4$\mu$" to 196.5$\mu$").

SUMMARY OF THE INVENTION

Thus, an object of the invention is to provide a low drag read/write head for use with a disk drive having a liquid bearing at the head/disk interface.

A further object of the invention is to provide a low drag head having the capability to maintain a relatively constant head-disk interface distance in relation to the movement of the head in relation to the storage medium.

A further object of the invention is to minimize that portion of the head running on a fluid bearing which is subject to a high shear rate.

Yet another object of the invention is to provide a head in accordance with the above objects which may be advantageously used with a bearing liquid having non-Newtonian viscosity versus shear rate characteristics.

A further object of the invention is to provide the above objects in a head design which utilizes a number of pads and which does not require the plane which all the pads have in common to be parallel to the medium surface or to the pad surfaces themselves during normal operation.

A further object of the invention is to achieve the above objects in a slider design which utilizes a pad height, fluid thickness and disk speed which renders drag on areas of the slider other than low-area pad surfaces insignificant.

These and other objects of the invention are achieved, in one aspect, by a recording head for a disk drive, the disk drive having a liquid bearing lubricant between a storage disk and the head. The head includes a slider body, the slider body having at least a first and second regions; and a transducer element, mounted on the first region of the slider body, wherein the first region of the slider body has a substantially higher drag on the disk, through the liquid bearing when moving through the liquid when the disk is rotating than the second region.

In a further aspect the slider body has at least a first and second ends wherein the second end of the slider body travels at a flying height which is substantially greater with respect to the disk when the disk is rotating than a flying height achieved by the first end.

In yet another aspect, the slider body has a top, bottom, first side, second side, front end and rear end. First and second pad elements are positioned on the bottom of the slider in axial alignment with respect to the length of the slider body. One of the pads, the core pad, is formed to have a recording gap therein coupled to a transducer element. In a further aspect, the leading edge of the non-core pad is beveled to cause it to fly higher than the core pad.

In another embodiment, the slider includes first and second pads, positioned on the bottom of the slider body adjacent the leading edge at a spaced distance apart, the first pad being adjacent the first side and the second pad being adjacent the second side, each pad being roughly rectangular in shape and having a ramped front edge. Further, a third pad is positioned adjacent the trailing edge of the slider body and the first side. Finally, a transducer element is positioned at the rear end of the slider body, and coupled to magnetic elements on the surface of the third pad for writing and reading information.

In yet another embodiment, a first and second pads are positioned adjacent the front end of the slider body at a spaced distance apart, each pad being roughly rectangular in shape and having a tapered edge. In addition third and fourth pads are positioned at the rear end of the slider body at the spaced distance apart. In a further aspect, the first and second pads are provided with a tapered leading edge to increase the lift of the pads. In yet a further aspect, the non-core rear pad is also provided with a beveled leading edge so that only the pad associated with the transducer element travels at low flying height.

BRIEF DESCRIPTION OF THE DRAWINGS

FIGS. 6A through 6C are end, bottom plan, and side views, respectively, of a two-pad slider in accordance with the present invention;

FIG. 6D is an end view of the two-pad slider shown in FIGS. 6A–6C illustrating the orientation characteristics of a head in accordance with the present invention when the head is travelling relative to the disk surface;

FIGS. 7A through 7C illustrate enlarged front, bottom plan, and side views, respectively, of a four-pad read/write head in accordance with the present invention;

FIGS. 8A through 8C illustrate enlarged front, bottom plan, and side views, respectively, of a first embodiment of a three-pad head in accordance with the present invention;

FIGS. 14A–14D illustrate a method for manufacturing a read/write head in accordance with the present invention;

DESCRIPTION OF THE PREFERRED EMBODIMENT

The present invention achieves the above objects of providing a novel head for use in an information storage device having high data storage capacity in a small physical form factor wherein a liquid bearing lubricant is utilized at the interface of the storage medium and an interactive element used to transfer data to and from the storage medium. In one embodiment, the storage device comprises a Winchester-type, magnetic storage disk drive. However, the present invention may be utilized in any storage device wherein the drag between an interactive element and the storage medium is critical. For purposes of explanation, the present invention will be described with respect to its application in a magnetic storage disk drive.

The acceptable level of drag for any storage medium travelling under a head with a liquid bearing is determined by limitations on the power of the actuator utilized to move the head relative to disk and the power of the spindle motor to rotate the disk relative to the head. In a portable computer, an additional concern is the capacity of the storage battery used as the power source. Naturally, the power consumption of such portable computers should be minimal. With reduction in the size of disk drives, there is a corresponding use of smaller spindle and actuator motors which require extremely low drag levels at the desired low flying heights necessary to achieve read/write resolution of the bit densities utilized with disk recording media to increase the available data storage space for the storage unit.

Figure 15:
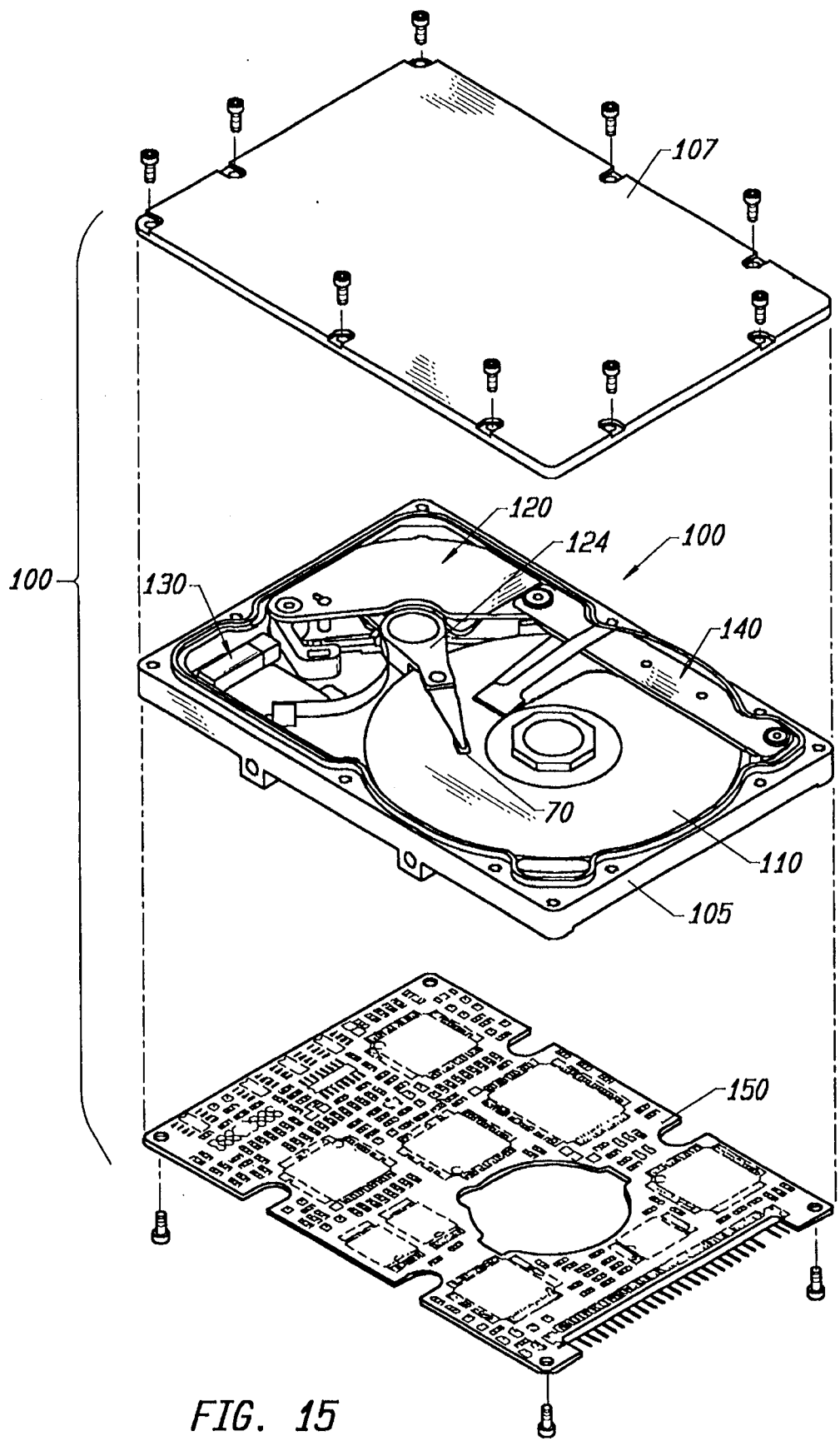
FIG. 15 is a perspective view of the major components of a two and one-half inch form factor disk drive in which the read/write head of the present invention is suitable for use.

For example, in a 2½" disk drive, such as that shown in FIG. 15, a drag level of approximately 1.2 grams or less at a disk speed of 340 inches per second (ips) would be acceptable. In such cases, it is also critical that the PW50 for the head be under 55 ns, and preferably even lower, at 340 ips to achieve recording densities at desireable levels, as the 65 mm diameter disks used in 2½" disk drives travel in a range of 250 ips at the inner data track to 450 ips at the outer data track. With existing media and inductive heads, this means the recording gap must be approximately 1μ" high during operation.

From the Newtonian drag equation set forth above, a reduction in the drag of a recording head supported by a liquid bearing could be achieved by reducing the area of the slider traveling on the fluid bearing, the viscosity of the lubricant, the velocity of the disk, or a combination of these factors. Again, with the high performance requirements of the disk drive, reducing the velocity at which the disk is traveling under the slider in the fluid is not acceptable since increased latency times will result from the reduction of velocity of the spin motor. In currently employed actuator structures, the track-to-track movement of the slider is relatively slow in comparison to the typical rotational speed, and therefore the drag component of such movement is insignificant in comparison to the drag of the slider in relation to the disk.

Slider configurations for an information storage device using a liquid bearing at the head/disk interface generally attempt to reduce the areas of high pressure with respect to the fluid by utilizing pads on the lower surface of the slider body, as shown in European Patent Application No. 0367510. Any number of pads may be provided, with one of the pads including a magnetic gap coupled to transducer coils. The presence of the pads serves to reduce the effective area of the slider in the bearing lubricant. Typically, heads are manufactured so that the areas adjacent to the disk, but not actually pad areas, are receded 2 to 4 mils (milli-inches) from the pad surfaces. If a slider were 88 mils wide×112 mils long, and the non-pad areas 4 mils deep (e.g., recessed from the pads), then simple Newtonian shear in the non-pad areas would be expected to be 0.26 grams drag at 500 ips. Since a goal of a total drag of such sliders is approximately 1 gram, this means approximately 25% of the drag results from non-pad areas. If such areas were only diced 2 mils deep, then this extra non-pad would be approximately 0.5 grams. These drag values are relatively easy to predict because the fluid operates in the Newtonian region at the very big spacing and low shear rates herein discussed. However, these drag estimates assume that the non-pad regions are actually full of fluid in the gap between the disk and non-pad areas. If the fluid on the disk is thicker than this 4 mil height of the pads then it will generally bridge the gap and create this extra 0.25 grams drag. If the fluid becomes thinner than the height of the pads, then it becomes much less likely that it will bridge the gap and actually create any drag. It is therefore generally desireable to keep fluid thickness on the disk surface at about 1 mil or less.

Drag is also created because of momentum transfer. Any part of the slider that is impacted by the sheet of fluid that is on the disk will experience a force due to the deceleration of the fluid. The contribution of drag as a result of momentum transfer is very difficult to measure or estimate. It is directly proportional to the thickness of fluid on the disk, the fluid density, head speed, and the head area impacted. It can also be affected by the degree to which those impacted areas are streamlined. The drag values measured and discussed herein are a sum of terms from pad shear, non-pad shear, and momentum transfer.

Figure 1:
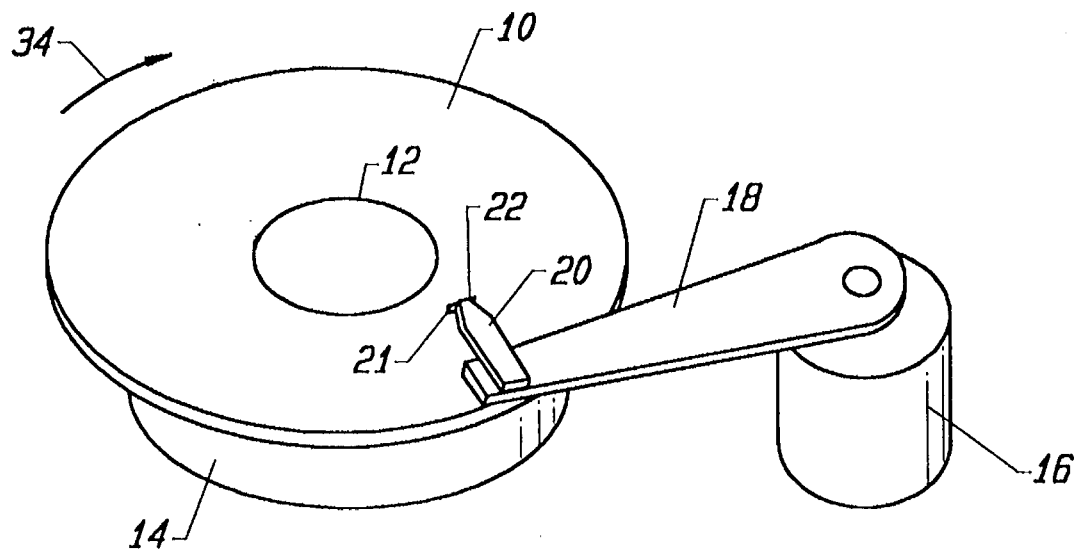
FIG. 1 is a simplified diagram of a typical prior art arrangement of a head-disk assembly.
Figure 2:
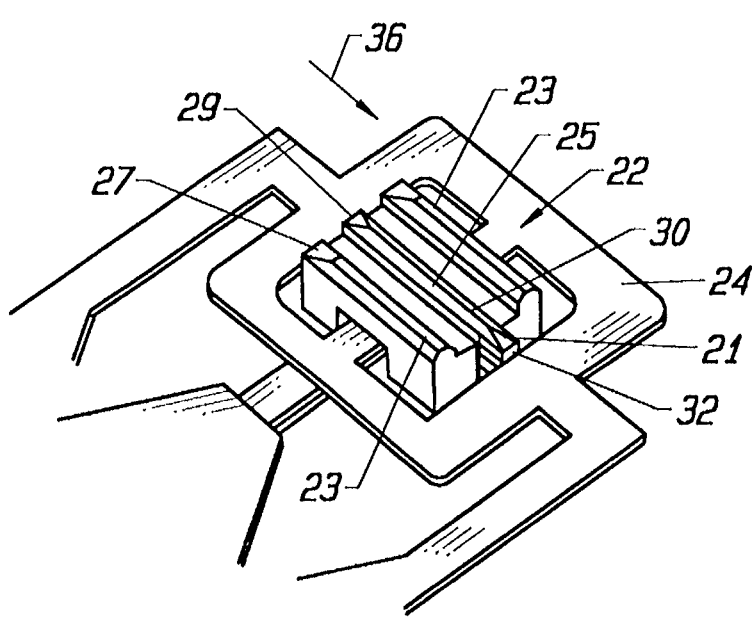
FIG. 2 illustrates an enlarged view of the underside of a typical prior art head which utilizes an air bearing interface between a head and a disk.

Several problems accompany reducing the area of a pad traveling on a fluid lubricant on a disk. First, the size of a particular slider, such as that shown in FIG. 2, is on the order of 112 mils long×88 mils wide, and manufacturing tolerances of the suspension mechanism for the head physically limit the minimum size of such sliders. Pads cannot be made arbitrarily small because the disk and head would become subject to damage due to shock and vibration incident to the drive. The pressure that any head pad and the disk are subjected to during a shock is proportional to the mass of the slider. If a shock creates a pressure greater than the yield strength of the slider material and/or the disk surface then one or both can be permanently deformed during the shock. Thus, to maintain shock resistance at a constant value, all other things being equal, the mass of the slider must be scaled down with the total pad area. It is also advantageous to shape the slider body and position the pads on it so that shocks will load all the pads with roughly the same pressure. There are practical limits to how small sliders can be made, but as the state of this art progresses, it will clearly be possible to scale down slider and pad sizes to reduce drag further. The orientation of the slider must be such that the recording gap, whether positioned at the rear of the slider or on another "active" pad on the bottom surface of the slider, is positioned such that the pole tips are relatively parallel to the surface of the disk. Any variation in the angle of the pole tips with respect to the surface of the disk can alter the area of maximum intensity of the flux incident upon the disk surface, and the flying height of the gap.

The orientation of the slider body is generally irrelevant, but the orientation of the planar surface of the pads is critical. If a slider is positioned against a disk, there is no guarantee that all the points on all the pads are actually in contact with the disk. In general, only one point from each pad will contact the disk. More points can be made to contact the disk by increasing the force pressing the slider and disk together and causing the slider and disk to deform, or by making the slider with the pads more nearly coplanar. The relationship of the planar pad surfaces to the planar disk surface is generally referred to as coplanarity.

Measurements made of the coplanarity of pads is possible by observing the pads with an interferometer made by Wyko Corporation, Tucson, Ariz. This instrument measures the height of a number of points on each pad with respect to an optical flat. The instrument then establishes a "best fit" plane for all the points observed on all the pads. It also establishes a best fit plane for each pad using only points on that pad.

In general, the plane for each pad is not quite parallel to the common plane. The slopes of these pad planes, with respect to the common plane, together with the pad dimensions, can be used to estimate which corner of the pad would touch the disk first and how high above the disk the other corners would be.

FIGS. 4A–4E show data taken in this manner for the core pads of 5 heads. The deviations from coplanarity of the front pads are of a similar magnitude, but are less important because there is no write/read transducer on the front pads and because their flying height is determined, as discussed below, in a different manner in accordance with the present invention. Points on the ramps were not used in any of the coplanarity calculations. The corner of each pad marked with a "0" is the corner that would touch the disk. The numbers near the other corners show the height in microinches that these corners would be at if the disk were not spinning, assuming that the pad is a plane.

Figure 4:
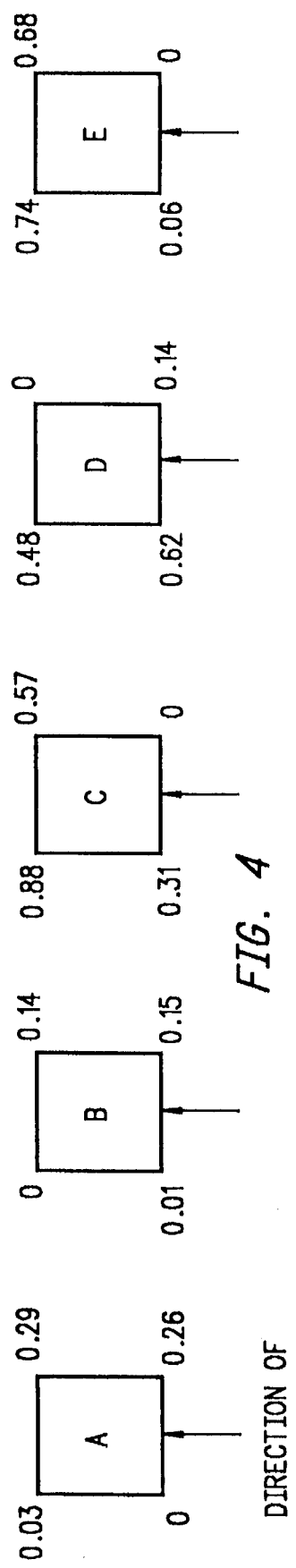
FIGS. 4A–4E are simplified, bottom views of pads utilized in a liquid bearing read/write head showing coplanarity data for 5 different core pads.

The deviations shown from coplanarity could have several consequences for head performance. First, since the pole tips are, in general, not located on the corners of the pads, the pole tips will, in general, be positioned at some height above the disk surface even when the disk is not moving. The exact spacing depends on the angles the pad is making with the disk, the force between the slider and disk, the size of the pad, and the location on the pad of the pole tips. In FIG. 4, the pole tips are approximately two-thirds of the height from the bottom of the pad and centered on the pad. When the disk is spinning under normal operating conditions, the front pads typically lift away from the disk to a flying height of approximately 5μ". Since the pads are approximately 100 mils apart and 3 mils long in the direction of motion, the slider body will tilt when the disk is moving so that the corners on the front edges of the core pads will be lifted approximately 0.15μ" further from the disk, simply due to geometry.

A second consequence these deviations from coplanarity could have is the generation of lift on the core pad. The heads shown above showed the following performance in a non-Newtonian, fluorocarbon fluid at 340 ips:

TABLE 1

| Head | Drag in Grams | PW50 in ns |
|------|---------------|------------|
| A    | 1.1           | 42.6       |

TABLE 1-continued

| Head | Drag in Grams | PW50 in ns |
|------|---------------|------------|
| B    | 1.0           | 38.6       |
| C    | 1.1           | 40.5       |
| D    | 0.9           | 39.2       |
| E    | 0.7           | 47.6       |

This shows that as long as the deviations from pad coplanarity are in the ranges shown for these heads, there is no serious effect on flying height. It is clear that as the pads deviate further and further from coplanarity, particularly if this is lifting the front of the core pad away from the disk, some angle will be reached at which significant lift will be generated, the core pad will fly higher, and performance will be affected.

A third consequence of deviations from coplanarity is the potential for damaging the disk and head. However, using the above data, no evidence of any disk damage has been observed.

Figure 5:
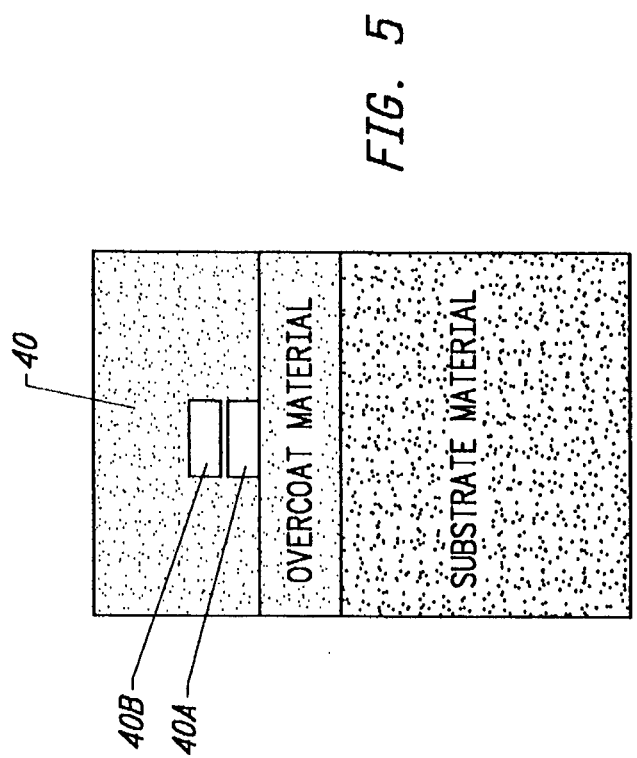
FIG. 5 is an enlarged, bottom plan view of a core pad of a thin film liquid bearing read/write head.

Most of the heads tested have comprised thin film heads of the type commonly used in the industry today. A typical 2 mils wide ×3 mils long core pad for a thin film head is shown in FIG. 5. In thin film head technology, the transducer is constructed on the slider using multilayer manufacturing processes. A first layer of overcoat material is deposited, using semiconductor manufacturing processes, then a first magnetically permeable material is deposited on the head substrate to form a first magnetic pole. Deposition of this material may be carried out by sputtering or plating or other such processes. After the first magnetic pole has been formed, spiral loops of electrically conductive material are deposited to produce a plurality of coiled turns occupying substantially the same plane. Typically, two to three layers of coils may be deposited. Thereafter, a second layer of magnetically permeable material is deposited to form the second pole. And finally, a second layer of overcoat material is deposited. The poles imbedded in these two overcoat layers are shown in FIG. 5.

With respect of FIG. 5, it should be noted that such a pad is typically not actually a totally planar surface. Current manufacturing processes typically result in the substrate and overcoat parts of the pad being planar, but the plane of the substrate is slightly higher than the plane of the overcoat; if the pad is placed against a disk, the substrate area will be closer than the overcoat. The height difference between these planes is typically from approximately 0.2μ" to approximately 1.5μ". Furthermore, the pole tips are typically not coplanar with the overcoat. Typically sliders have pole surfaces 40a, 40b that are parallel to the overcoat but from 0.2μ" above to 0.2μ" below the overcoat surface. The sum of these two steps is usually called pole tip recession, and is typically approximately 0.5μ". The numbers given in FIG. 4 for coplanarity of the core pads were actually derived from points on the substrate only. Thus, in FIG. 4A, for example, the pole tips would actually be approximately 0.5μ" further from the high point than the 0.03 and 0.29μ" numbers shown.

Ideally, a single pad head having an extremely small area (in an ideal sense, only the pole tips) would provide the minimum drag in a drive with a liquid bearing. However, there are several practical problems with such a one head pad.

In particular, even though it would be possible to make a slider with a single small pad, it is likely quite impractical, given limitations on manufacturing tolerances for disk drives, to install the head in the drive so that the plane surface of the pad is near enough to parallel to the disk surface. Furthermore, given the rather large size of a slider which includes a write/read head, and the small size that is required of a single pad, it is quite impractical to build a gimbal that would allow the pad to automatically align itself parallel to the disk in response to the head loading force. The inevitable significant deviations from co-planarity of this single pad would create spacing problems from the poles to the disk, and also result in a similar potential for the generation of too much lift when the disk is moving. This problem has been addressed in the industry by Censtor, Inc., in the case of an unlubricated interface, by installing a single pad slider into a Winchester-type disk drive without any liquid interface and allowing the head to wear until the pad surface is parallel. These heads then continue to wear throughout the life of the drive, with several negative consequences.

While Mo., discussed above, technically teaches a one pad head, the bottom surface area of the pad is nearly the size of the slider and teaches away from lowering the area of the slider since an ample air bearing load surface is required to maintain any significant flying height.

In accordance with the present invention, a practical solution to the problem of head drag has been devised wherein only a portion of the total slider body of any particular slider is allowed to fly close to the disk surface while the head is supported by, a liquid bearing interface. Thus, the area of the head which is subject to drag is substantially reduced. In one aspect, a recording gap is provided in a pad and the portion of the slider wherein this active core pad is located is caused to fly at a relatively low flying height with respect to the disk, while the balance of the slider is caused to fly at a much greater distance with respect to the disk. In this aspect, the non-active, relatively high flying pad or pads define a linear or planar surface with the active pad, and maintain stability for the slider body at the head disk interface. The portion of the slider body including the recording gap, or other interactive element, is allowed to fly close enough to the storage medium to assure adequate performance. The second portion of the slider body flies at a greater height with respect to the medium and acts to stabilize the head, with a practical gimbal connected to the slider to allow the head loading force to press the head into an orientation that results in the portion including the transducer to be parallel enough to the storage medium. This second region of the slider is made to fly far enough from the medium that it does not create significant drag. Particular embodiments of read/write heads utilizing this aspect of the invention are described as follows.

Figure 6A:
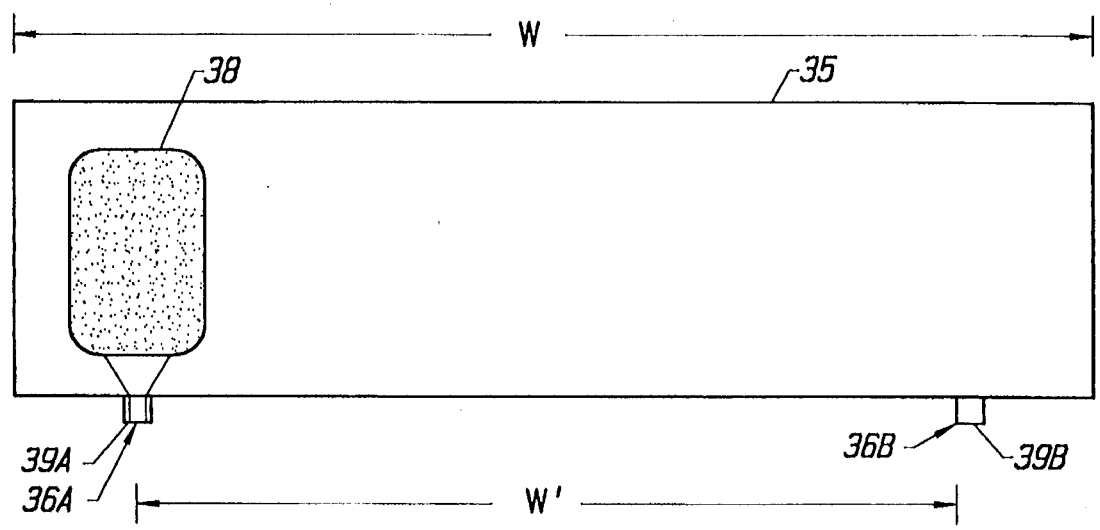
Figure 6B:
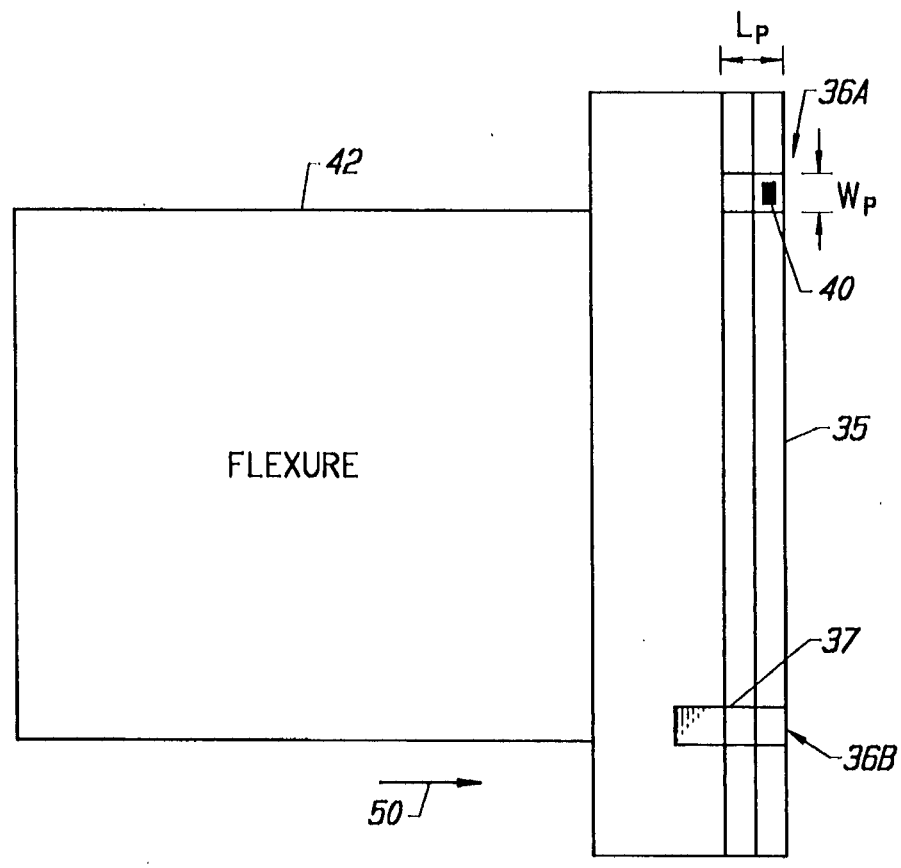

FIG. 6A is a rear view, FIG. 6B a bottom view and FIG. 6C a partial side view of a two-pad head in accordance with the present invention. It should be understood that drawings in 6A–6C are not to scale and various aspects thereof have been exaggerated for clarity. Generally, the head may comprise a thin film head. The two-pad head includes a slider body 35 affixed to a flexure 42 which may be bonded or staked to an actuator arm 43 positioned by conventional means such as a voice coil motor. Slider 35 is effectively bonded to flexure 42 with upper arm 42a and lower arm 42b at a position which is at the same height above the disk as the center of mass of slider body 35. Alternatively, separate upper and lower arms 42a, 42b are attached at equal distances above and below the center of mass of the head. These upper and lower arms 42a, 42b help maintain the surface of the core pad parallel to the disk during disk height changes due to disk runout. As shown in FIGS., 6A and 6B, slider body 35 is formed to have two pads 36a and 36b. As shown in FIG. 6A, thin film head windings 38 are coupled to a recording gap 40 on core pad 36a. The motion of the disk relative to the slider body 35 is shown by arrow 50 in FIGS. 6B and 6C. Each pad 36a, 36b has an approximate length, $l_p$, of 3 mils, and an approximate width, $w_p$ of 2 mils.

The slider 35 shown in FIGS. 6A–6C has an extremely low mass because of the relative shortness of the slider. Generally, slider 35 may have a width W of about 88 mils, the current standard width of a so-called 70% slider—the industry standard size air bearing recording head. Slider 35 generally has a length L of 12 mils. In addition, because slider 35 is attached to the flexure at the same distance from the pad surfaces as the center of mass, any torques that might be created during the radial acceleration or deceleration of the head during track-to-track seeks or shocks, will not tend to lift the head off the disk. Both these factors make the head very shock proof. As shown in FIGS. 6B and 6C, the non-core pad 36b may be provided with a ramp 37 which induces the non-core pad to travel at a greater flying height ($h_2$) with respect to a disk 10 than the flying height ($h_1$) achieved by core pad 36a, as shown in FIG. 6D. Because of the width W' between the non-core pad 36b and core pad 36a on the order of 70 mils, a 5μ" difference in the respective flying heights between non-core pad 36b and core pad 36a will result in only a negligible change in the orientation of the core pad with respect to the disk; hence, recording gap 40 remains relatively parallel to the surface of the disk. Alternatively, this two-pad head could be made to have less drag by reducing pad size and head load, while maintaining the same shock resistance as a four-pad head, discussed below.

As noted above, one problem in using the two-pad head shown in FIGS. 6A–6D is in orienting core pad 36b such that the core pad is close enough to parallel with respect to the disk. One solution to the orientation problem is to run the head against a rotating dry disk to lap the core pad to a level where they become parallel with the disk surface. Subsequently, the bearing lubricant may be provided to the interface to prevent further wear.

Figure 7D:
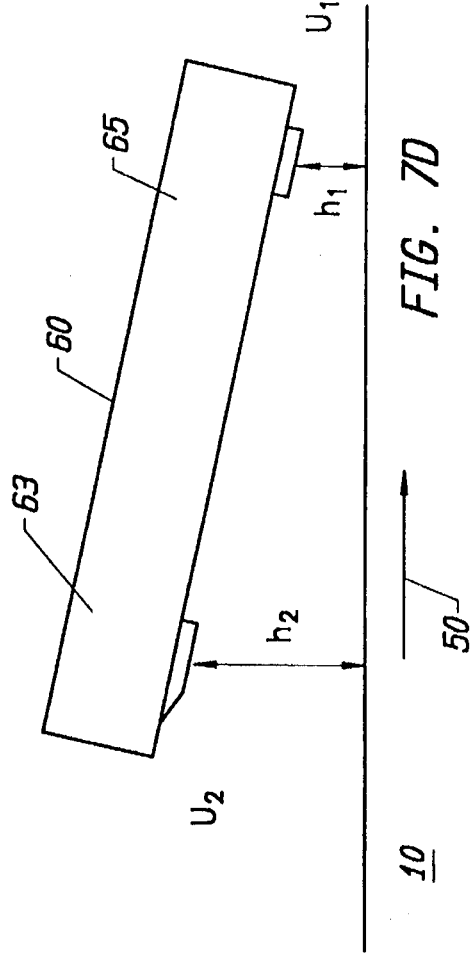
FIG. 7D illustrates the orientation characteristics of a head as shown in FIGS. 7A–7C in accordance with the present invention when the head is travelling relative to the disk surface.

FIGS. 7A–7C are rear, bottom, and side views, respectively, showing a first embodiment of four-pad head in accordance with the present invention. The head described with respect to FIGS. 7A–7F is generally referred to as a compolithic-type head manufactured by AMC Corporation. However, as should be readily understood, the principle attendant use of the present invention in a compolithic head apply equally to use in a thin film head other magnetic head technologies, and optical heads.

A four-pad embodiment of a recording head for use in accordance with the present invention includes a slider 60 having four slider pads 62 with flat bearing surfaces 64. Each pad has a length $l_p$ of 3 mils and a width $w_p$, of 2 mils. It is noteworthy that the length and width of the pads may vary within a range of 0.5 to 4.0 mils. Slider 60 has a length L' of about 118 mils and a width W" of about 88 mils. Slider 60 may be mounted at the trailing end of a suspension assembly coupled to an actuator arm, as discussed above. As illustrated in FIGS. 7A–7C, a pair of bearing pads $62a_{1-2}$ and $62b_{1-2}$ are carried on each side of slider 60. Transducer coils 67 are mounted on the rear pads $62b_{1-2}$ on each side of slider 60. A recording gap (not shown) is formed in at least one of pads 62b, which carry transducer coils 67. Slider 60 has heads on only the rear of both trailing pads. Only the outside transducer head (closest the edge of the disk) is generally active in data taking. The gap is not located at the trailing edge of the pad, but 6 mils in front of it in the middle of a 0.7 mil wide rail of ferrite (not shown) that extends a total of 10 mils behind the trailing edge of the pad. As seen most clearly in the front and side views, FIG. 7A and 7C, each of the front bearing pads $62a_{1-2}$ has a forward surface 66. Each surface or "ramp" 66 has a length $1_r$ which may vary in accordance with the amount of lift desired from the front pads in relation to the rear pads.

Figure 7E:
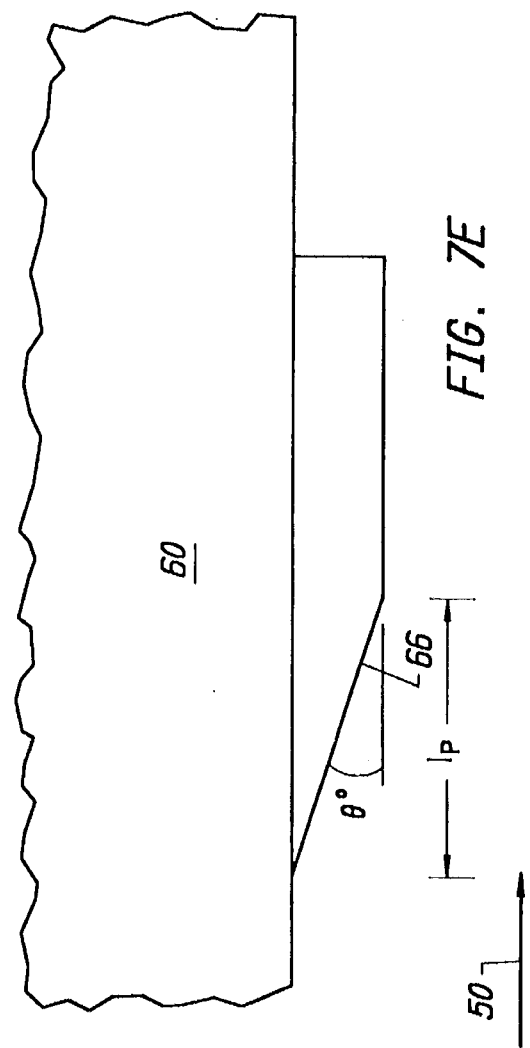
FIG. 7E is an enlarged view of the front pad of the head shown in FIGS. 7A–7C illustrating ramp length and angle for a single pad of the slider.

The edges of pads $62a_{1-2}$, $62b_{1-2}$ may be slightly rounded or "blended" as is known in the art as shown in 66a in exaggeration. Ramps 66 shown on the front pads $62a_1$, $62a_2$ have a slope θ of 0.8°–3.0°, as shown in FIG. 7E, and have a length $1_r$ of about 3.0 (±0.5) mils. Pads 62 are generally manufactured to be 3–4 mils above the bottom surface of the slider. The load is 5 grams and is applied at a point 61 that results in equal pressure on all pads when the disk is stopped. It should be noted that the drag effectively shifts the load point 61 forward a small distance when the disk is spinning. This has no significant effect on head performance.

Figure 3:
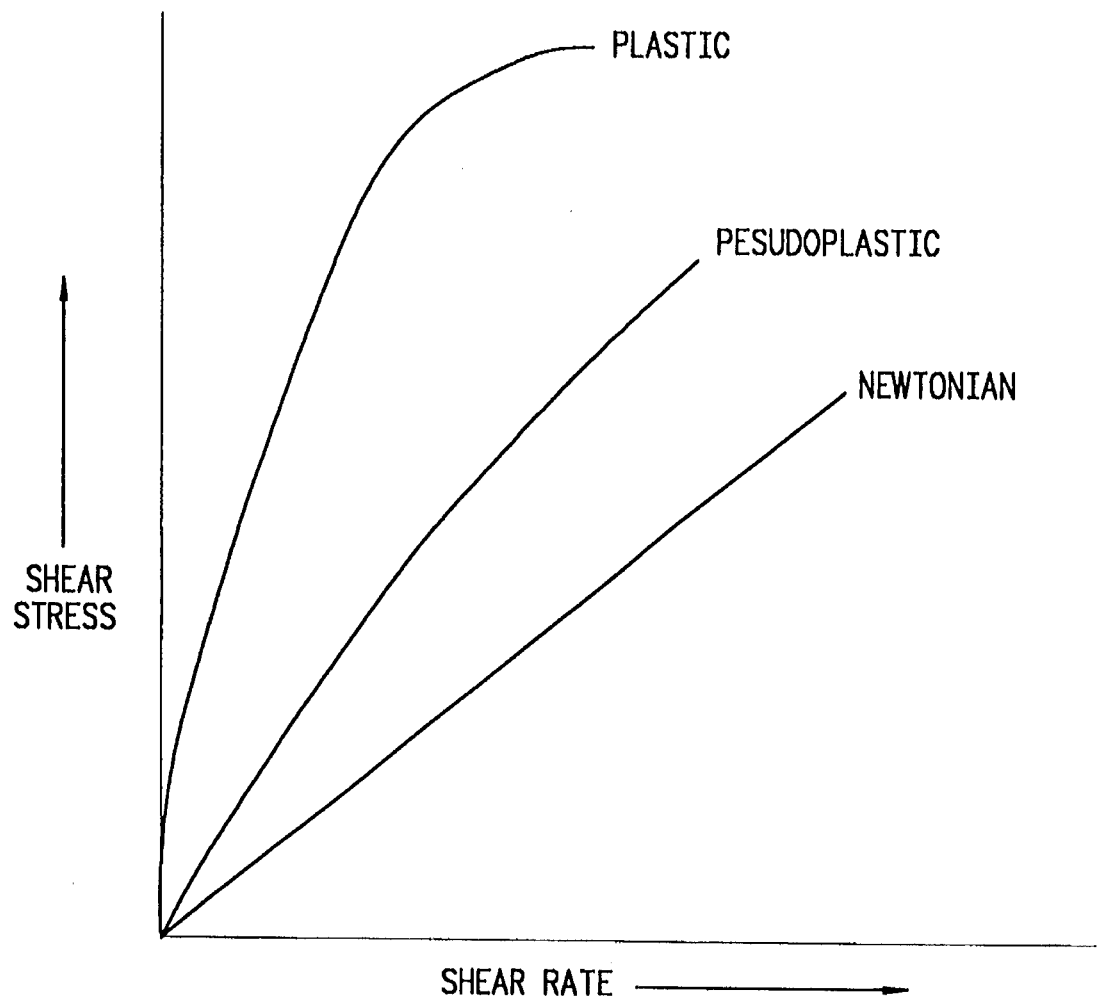
FIG. 3 is a graphic representation of the apparent viscosity of Newtonian fluids as compared with the apparent viscosity of plastic or pseudo-plastic fluids.

FIG. 7D shows the effect of providing ramps 66 on front pads 62a. In particular, when the disk is moving in the direction of arrow 50, ramps 66 cause the forward portion 63 of slider body 60 to travel at a height $h_2$ with respect to disk 10 while the rear portion 65 of slider body travels is at height $h_1$, which is substantially less than $h_2$. Owing to the fact that the shear stress of the liquid bearing lubricant increase with the shear rate of the fluid, as shown in FIG. 3, the increased flying height $h_2$ of the leading edge pads, results in substantially lower drag for the head as a whole, whether the head travels on a Newtonian or non-Newtonian fluid. The rear pads $62b_{1-2}$ thus contribute the majority of the total drag of the slider 60 in the lubricant in the case where neither rear pad $62b_{1-2}$ is ramped.

Figure 7F:
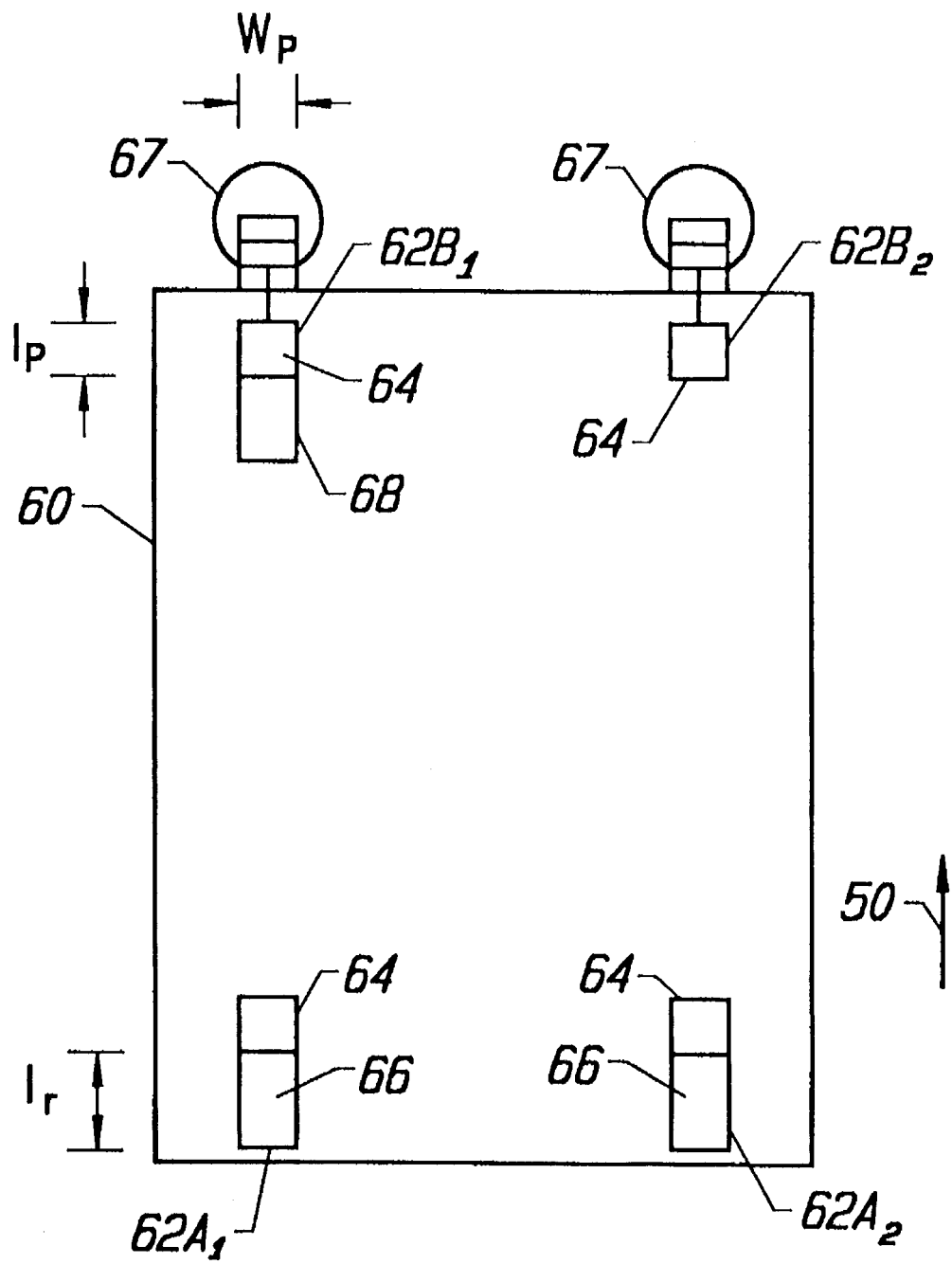
FIG. 7F is an enlarged, bottom plan view of an alternative embodiment of a four-pad read/write head in accordance with the present invention.

FIG. 7F shows a bottom view of an alternative embodiment of a four-pad head in accordance with the present invention wherein a ramped leading edge 68 may be provided on pad $62b_1$, where pad $62b_2$ is used as the active head in reading to and writing from the disk. Provision of ramp 68 on the rear, non-active pad $62b_1$ induces a higher flying height in pad $62b_1$ with respect to the disk, such height being on the order of $h_1$ achieved by pads $62a_{1-2}$. In such an embodiment, only the active pad, coil $62b_2$, would remain at a low flying height with respect to the disk surface, while the remaining three pads fly at higher levels.

The application of ramps to a four-pad head in accordance with the present invention has been verified empirically as follows. In a first instance, a test on a four-pad head having no ramps applied to any of the pads, loaded with 3 grams at the center point, having pads of approximately 2 mils in width and 3 mils in length, achieved a drag of 1.9 grams, and a PW50 of 50 ns. After applying ramps to the front pads of such head, with the same load, drag was reduced to approximately 0.8 grams, while the PW50 remained at 50 ns. In a second example, where the pad sizes were 3 mils×3 mils, a four-pad head without ramps loaded with 5 grams at its center point had a measured drag of 3 grams, and a PW50 of 50 ns. After application of ramps, loaded with 5 grams at the center point, the drag was reduced to 1.5 grams, while the PW50 remained at 50 ns.

Shown in FIGS. 8A–8C is an alternative, three-pad head design for a low drag head in accordance with the present invention. FIGS. 8A–8C show a rear view, bottom view and side view, respectively, of the three-pad thin film head in accordance with the present invention. Again, the principles taught herein with respect to a magnetic, thin film head apply equally to various types of recording technology. Slider 70 has three flat bearing surfaces 74, including two front slider pads $72a_1$ and $72a_2$ and a rear slider pad $72b_1$. (It should be understood that the terms front and rear are relative to the motion of the disk, designated by arrow 50 in FIG. 8A–8C.) The rear pad $72b_1$ contains a recording gap, similar to that shown with respect to FIG. 5, coupled to a coil arrangement (not shown). In a manner similar to slider 60, each forward pad $72a_{1-2}$ contains a ramp 76 to enable slider 70 to attain flying height characteristics similar to that shown in FIG. 7D for slider 60. Also shown in FIG. 8A is a load point 78 for slider 70 which achieves an optimal flight characteristics for this particular read/write head. In FIG. 8A, load point 78 is positioned such that the load applied by the suspension assembly is evenly distributed to all three pads. In certain embodiments, it may be advantageous to move load point 78 to shift the load toward the trailing edge of the slider, or closer to either side of the slider, to alter the flying heights of the respective pads.

Figure 8D:
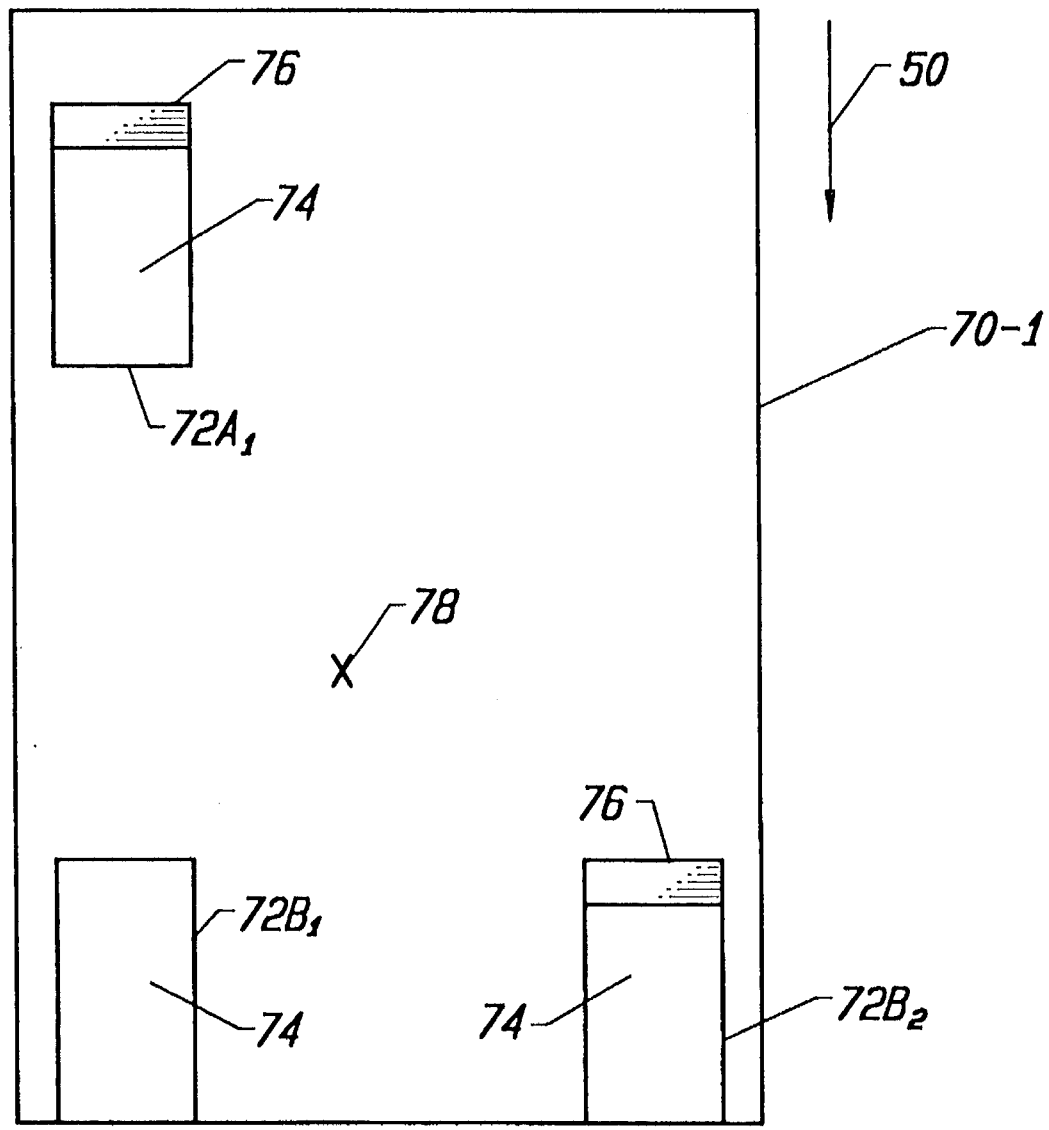
FIG. 8D is a bottom plan view of a second embodiment of a three-pad head in accordance with the present invention.

FIG. 8D shows an alternative embodiment of a three-pad head in accordance with the present invention. As shown therein, slider 70-1 includes only a single leading edge pad $72a_1$ and two trailing edge pads $72b_1$, $72b_2$. In accordance with the invention, rear pad $72b_2$ is provided with a ramp 76 similar to leading edge pad $72a_1$m while core pad $72b_1$ has no ramp. In this embodiment, core pad $72b_1$ will remain at a position relatively close to the disk surface when travelling in the fluid (e.g., at height $h_1$), while pad $72a_1$ and $72b_2$ will achieve greater flying heights (e.g., heights $h_2$) with respect to the disk surface.

In the embodiment shown in FIG. 8D, for a head having pads which are 2 mils wide×3 mils long, loaded with a 5 gram load such that the load was equal on each pad, running at 340 ips, the measured drag was 1.2 grams, with a PW50 of 52.0 ns prior to addition of the ramps. After addition of the ramps, the drag dropped to 0.6 grams, with a PW50 of 52.5 ns. The data demonstrates that adding a ramp to a rear pad will not impact the rear forms of the core pad. Note that the separation in distance between the rear pads is approximately 67 mils.

Figure 8E:
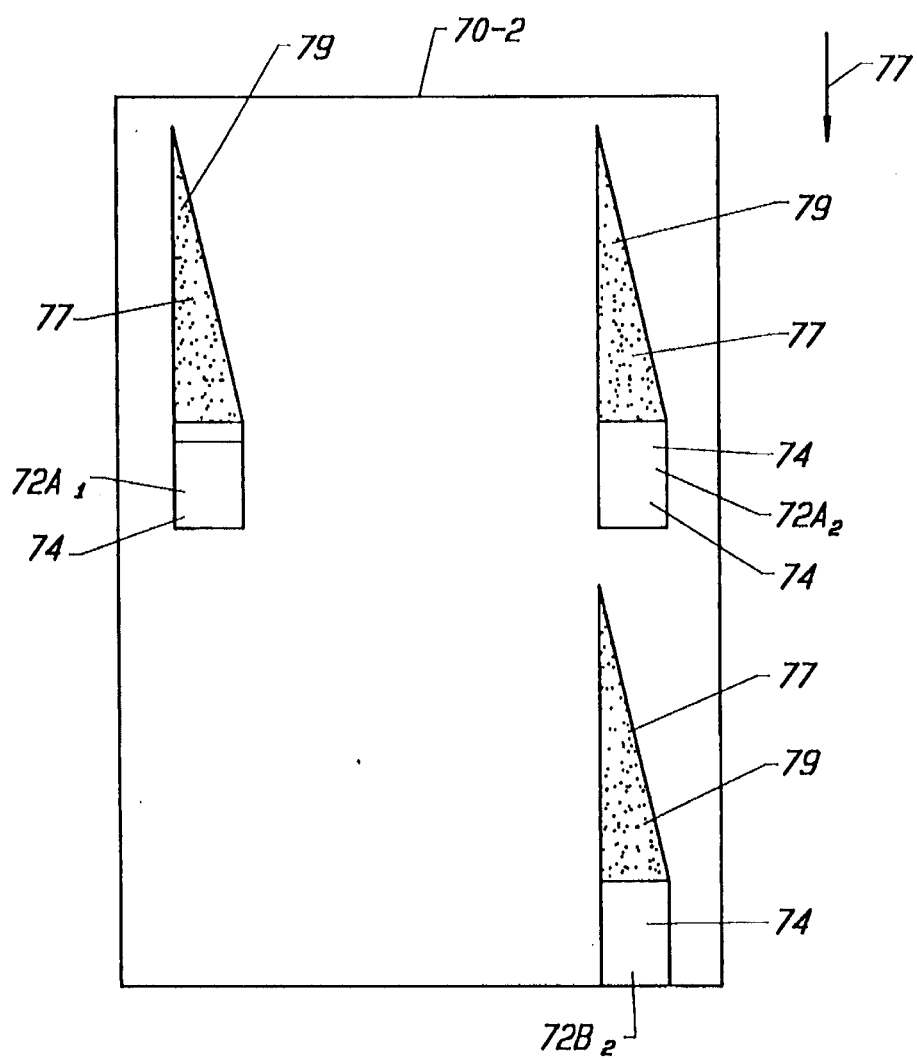
FIG. 8E is a bottom plan view of a third embodiment of a three-pad head in accordance with the present invention.
Figure 8F:
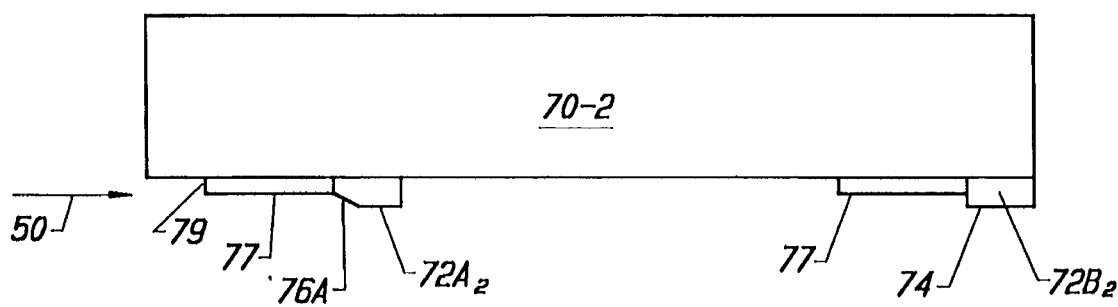
FIG. 8F is a side plan view of the third embodiment of the three pad head shown in FIG. 8E.

FIGS. 8E and 8F are yet another embodiment of a three-pad head in accordance with the present invention. Slider 70-2 as shown in FIG. BE, includes first and second leading edge pads $72a_1$, $72a_2$ with ramps, and a single trailing edge core pad $72b_2$. Triangular areas 77 are provided in front of leading pads $72a_1$, $72a_2$ and $72b_2$. These triangular areas 76a are parallel to the pad surfaces and lower than the pad areas by >5µ"; that is, they will be approximately 5µ" further from the disk during operation than the pad areas. They are designed to function in a similar way to the triangular pads in European Patent Application Serial No. 0 367510. The difference is that these areas are far enough away from the disk during normal operation that they will not contribute significant drag, while being close enough to the disk that they can still effectively urge the liquid bearing fluid film toward the disk outside edge when the disk is rotating. In order for pads 74 to function effectively they should not be made further from the triangular areas 76a than the minimum fluid thickness on the disk. Such an embodiment is utilized in a disk drive where a small amount of fluid is applied to the inner diameter of the disk surface such that the fluid will spin out toward the outer diameter. Such fluid can be interrupted or pinched off by head operating in one track. The triangular design of ramp 77 tends to overcome this problem by cleaving the sheet of fluid on the disk and tending to urge it towards the outer diameter of the disk.

Most of the heads described in this application show that the front of the front pad is not exactly on the front edge of the slider body. It has been determined that if the pad is made to be a few mils from the front edge of the slider body, the fluid flow across the disk is not interrupted as much by the head. The small cavity created between the body of the slider at the front of the pad and the disk seems to trap fluid and facilitate reapplying it to the disk for continuous flow from the inside diameter of the disk to the outside edge in spite of the relative motion of the head.

Pad 74 in FIGS. 8E–8F has generally the same area as the pads shown with respect to FIGS. 8A–8D. Ramps 76a are provided on the surface of pads $72a_1$, $72a_2$. Such ramp 76a would tend to streamline the pads and reduce momentum transfer drag and generally create lift on the front pad $72a_1$, $72a_2$ so that they no longer create any significant drag. Providing front pads $72a_1$ and $72a_2$ approximately 1μ" above ramp 76a greatly reduces the drag contributed by front pads 72a. In addition, since the tips of the triangular areas 77 are receded, they generally do not contact the disk surface, thereby preventing any damage due to chipping of ramp tip 77. The ramps herein described need not be a simple plane at an angle to the pad. The ramped area can be a curved surface that roughly approximates the dimensions of the ramps described. The ramped area can also be parallel to the pad but separated from it by roughly the same distance as the highest part of the ramps described. For example, a planar ramp area 300μ" long parallel to the planar pad area, and approximately 5.2μ" further from the disk surface when the disk is stopped would have essentially the same tendency to lower drag by lifting the pad as would a planar ramp 300μ" long at 1° to the disk surface.

Figure 9:
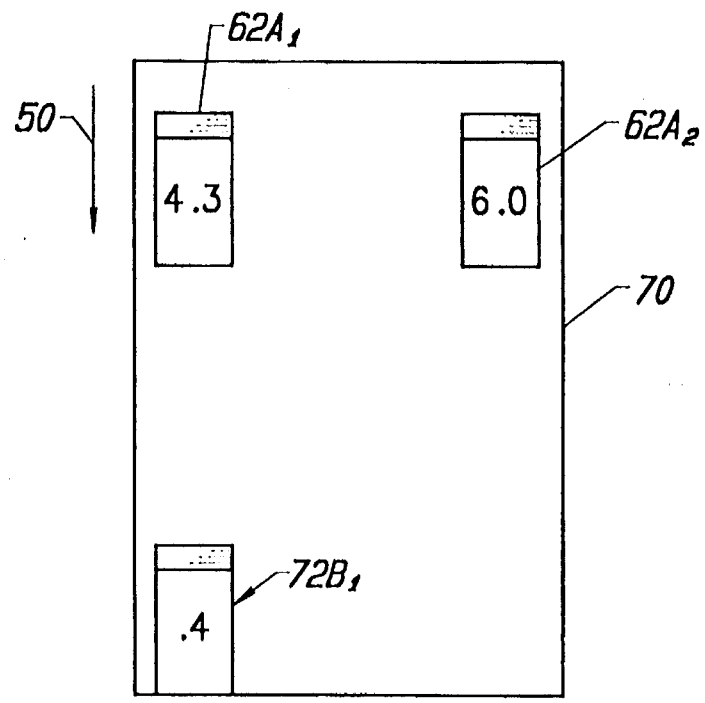
FIG. 9 is a representation of the respective flying heights of the right rear active pad, and the front right and front left pads, respectively, of a three-pad read/write head such as that shown in FIGS. 8A–8C.

FIG. 9 shows measured, respective flying heights for a three-pad head, such as that shown in FIGS. 8A–8C. In the data measurements shown in FIGS. 9–12, the liquid bearing used is a perfluoro-polyether, such as Galden D02, manufactured by Montefluos, Milan, Italy, and measurements taken by an interferometer. U.S. Pat. No. 4,681,447, INTERFEROMETER APPARATUS AND METHOD FOR DETERMINING THE SPATIAL RELATIONSHIP OF TWO OR MORE OBJECTS, Robert J. Davidson, issued Jul. 21, 1987, exemplifies the long known hetrodyne method of measuring the phase difference between two lightwaves to resolve the spatial relationship of two reflective objects, such as a recording disk and a "flying" head. The interferometer instrument, available from Lafouda, exploits the same theoretical principle in a radically different way: instead of delivering the laser light as a collimated flood over the head and its neighborhood, the light is focused only on the spots of interest. In the Lafouda configuration, the experiment is performed in an almost all dark area and all the 2-frequency coherent light is concentrated on two points whose relative position is being tracked. This increase (by more than 1000 times) of the optical power density at the measurement sites leads to a dramatically increased signal strength, which in turn enables the resolution in confidence of displacements as small as 1/512 of the wavelength. This yields a resolution of 12.4 Å. Corrections for the zero spacing error are made using the approach described in an article entitled "Estimation of the Zero-Spacing Error Due to a Phase Shift of Reflected Light in Measuring a Magnetic Head Slider's Flying Height by Light Interference," by Fumitaka Muranushi, Katsuyuki Tanaka, Yashinori Takeuchi, published in *Advances in Information Storage Technology*, Vol. 4, edited by Bharat Bhushan, published October 1992 by ASME Press. A complete description of the interferometer solution is published in an article entitled "A New Approach to Accurate Flying Height Measurements All the Way Down to Contact," by Dominic Veillard, *Rigid Disk Head Media Tech. Newsletter*, Vol. 6, #2, October 1992.

In FIG. 9, the numerical values shown with respect to each pad represents the relative flying heights of the pads with respect to the disk over an average of many points on the head and many disk rotations. The average flying height ($h_1$) of the right rear active pad is 0.4μ". In the particular head shown in FIG. 9, the ramp length of the front right pad $62a_2$ was 6.66 micrometers, while the ramp angle θ was 2.15°. The ramp length for the front left pad $62a_1$ is 7.74 micrometers, with a ramp angle θ of 1.69°. The respective flying heights average 4.3 and 6.0μ" for the front left and front right pads, respectively. This flying height is approximately 11 to 15 times greater than the flying height of the rear, active pad at 0.4μ". The total measured drag for the head in FIG. 9A–9C was measured at 0.76 grams at 340 ips, significantly lower than the $1.69 \times 10^4$ dynes (approximately 17.2 g) measured for the four-pad head as set forth in the '368 patent.

Figure 10:
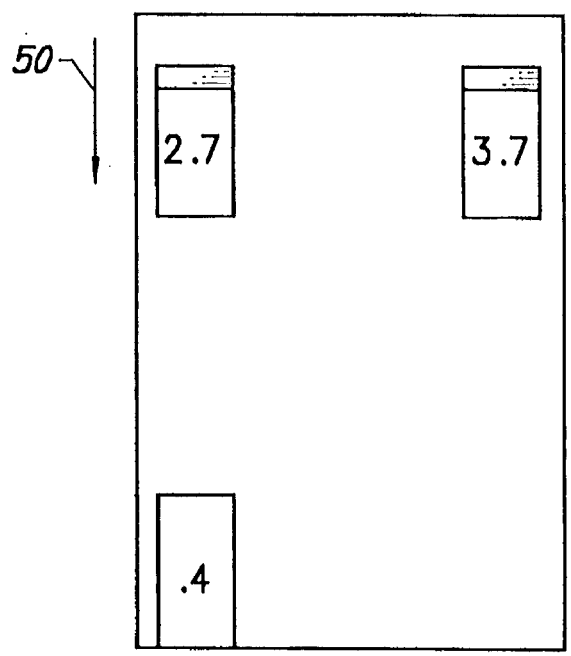
FIG. 10 illustrates the respective flying heights of a three-pad head such as that shown in FIGS. 8A–8C 8C having ramps lapped into the front pads with a first ramp length and angle.

FIG. 10 shows the flying height characteristics for pads of a three pad slider 70 as shown in FIGS. 8A–8C. In FIG. 10, the respective flying heights for the front left pad and front right pad as 2.7μ" and 3.7μ" respectively, while the active pad is at 0.4μ". The flying height for the front left pad is achieved with a ramp length of 2.43 micrometers and a ramp angle θ of 0.70°. The front right pad is provided with a ramp length of 2.39 micrometers, and a ramp angle θ of 0.88°. The total drag for the head has been measured at 0.84 grams at 340 ips. The ratio of the flying heights between the front pads and the rear pad is between 6.75:1 and 9.25:1.

Figure 11A:
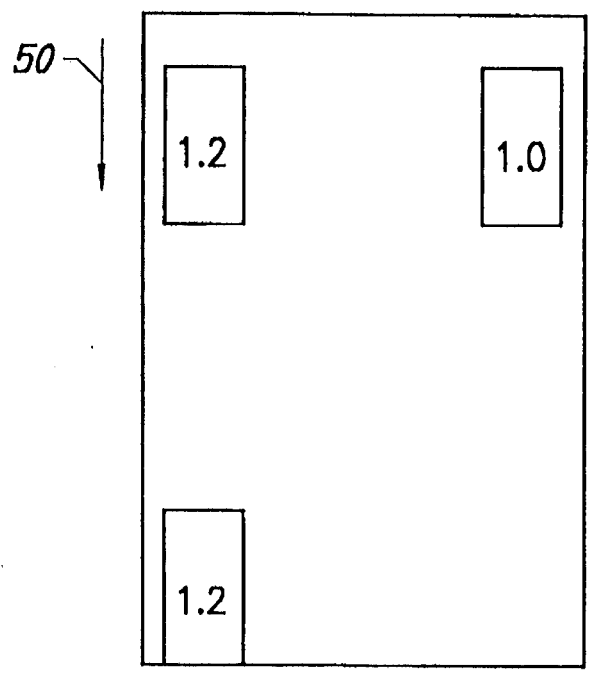
FIGS. 11A and 11B illustrate respective flying heights of a three pads of a three-pad head first having no ramps on the leading edge pads (FIG. 11A), and subsequently having ramps placed into the pads (FIG. 11B)
Figure 11B:
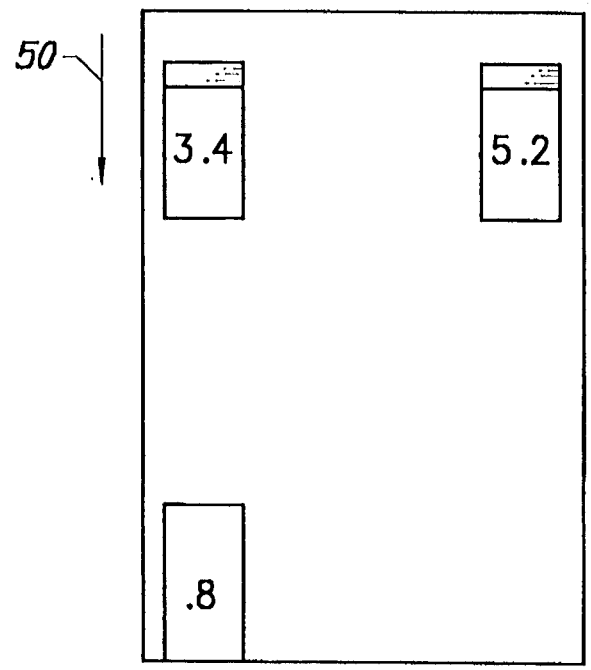

Notably, the characteristics of $h_1$ vs. $h_2$ can be altered by changing the angle and length of the ramps formed in the leading edge of the forward (front) pads. For example, FIG. 11A shows the flying height characteristics of each of the three pads of a particular three-pad head wherein no ramps 76 are included on the forward pads 72a. As shown in FIG. 11A, the flying height for the front left pad $72a_1$ and front right pad $72a_2$ is approximately 1.2μ" and 1.0μ", respectively, while the core pad height is 1.2μ". The total measured drag on this particular head is 1.65 grams at 340 ips, significantly greater than the measured drag of the three-pad heads with ramps discussed above. By comparison, FIG. 11B shows the effect of adding ramps to the same head described with respect to FIG. 11A. As shown therein, the front left and right pads have flying height of 3.4μ" and 5.2μ" respectively, while the core pad has a flying height of 0.8μ". Thus, the provision of ramps on the forward pads will yield the desired flight characteristics for the head and significantly reduce drag whether using a plastic or pseudo-plastic non-Newtonian liquid bearing or a Newtonian fluid.

Figure 12:
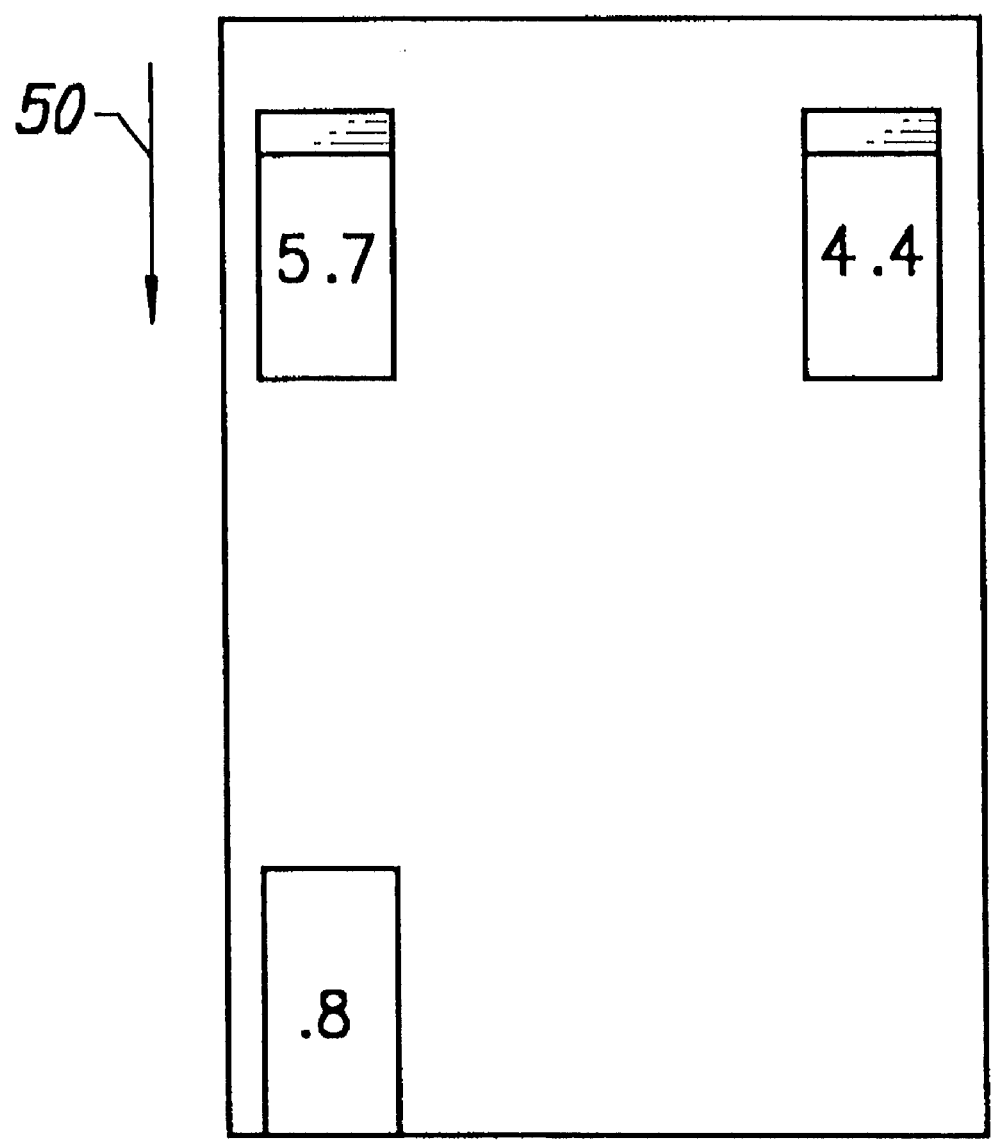
FIG. 12 illustrates the respective flying heights of three pads of a three-pad head such as that shown in FIGS. 8A–8C having a second ramp length and ramp angle.

The flight characteristics of a three-pad head having longer ramps and greater ramp angles than that discussed with respect to FIG. 10, is described with respect to FIGS. 12. Shown in FIG. 12 is flight data for a three-pad head, wherein a front left pad with a ramp length of 14.34 micrometers and a ramp angle of 2.16° has an average flying height of 5.7μ"; a front right pad having a ramp length of 10.84 micrometers and a ramp angle of 1.94° has an average flying height of 4.4μ"; and the rear active pad no ramp angle has an average flying height of 0.8μ". The total drag on the head configured as described above is 0.5 grams, less than that taught with respect to the head shown in FIG. 10. The ratio between the flying heights of the front pads and the rear pad for the head described with respect to FIG. 12 is approximately 5:1 to 7:1. Thus increasing ramp lengths and ramp angles for a particular head design will yield a rather significant increase in flying height relative to the non-ramped rear pad.

While the values set forth above are measured flying heights, PW50 is a measurement of head performance which more accurately reflects how the head will perform in a drive. Table 2, set forth below, shows data for 3 different heads and compares core pad size, drag and PW50 values, before and after ramping of the 3-pad heads. PW50 data is the most accurate and clearly shows that the when ramps are put on the front pads, the drag drops, but the electrical performance stays the same. Each of the three heads tested had virtually the same geometry. Ramps were approximately 0.4 mils long and at approximately 1°. The load was 5 grams and was applied at a point that would make the load on each of the three pads approximately equal; disk speed was 340 ips.

TABLE 2

| | Size of Core Pad in Mils | | Drag Grams | PW50 In ns |
|---|---|---|---|---|
| first head | 1.9 wide × 2.7 long | before front pads were ramped | 2.2 | 50.7 |
| | | after ramps added | .8 | 48.8 |
| second head | 1.9 wide × 2.7 long | before front pads were ramped | 2.2 | 50.7 |
| | | after ramps added | .8 | 52.6 |
| third head | 1.8 wide × 3 long | before front pads were ramped | 2.0 | 52 |
| | | after ramps added | .7 | 52.5 |
| average | | before front pads were ramped | 2.1 | 51 |
| | | after ramps added | .8 | 51 |

PW50 depends very sensitively on the flying height; the fact that PW50 did not change means flying height did not change.

Figure 13:
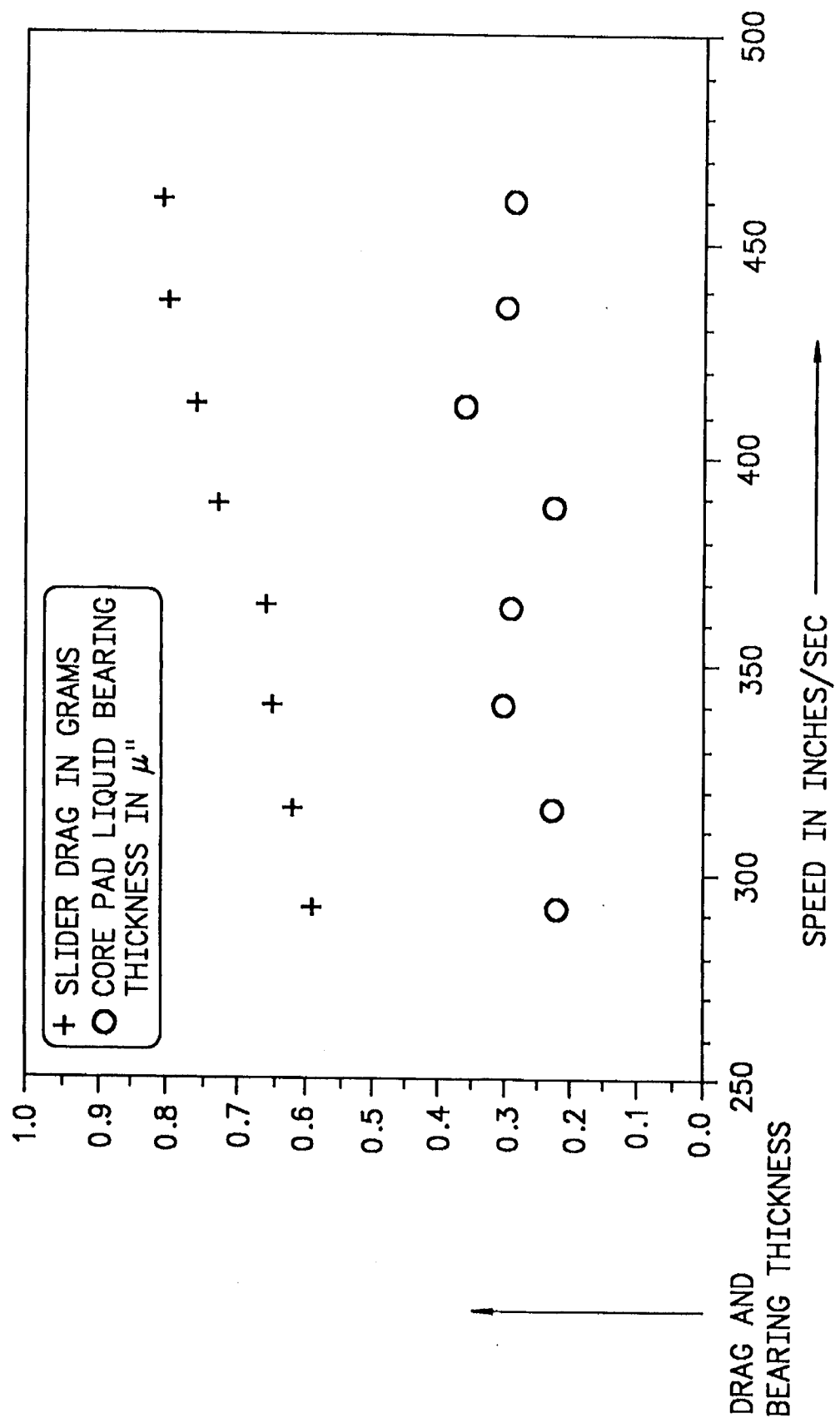
FIG. 13 is a graph representing the relationship between disk speed, head drag and flying height.

FIG. 13 shows the relationship between the measured drag and observed bearing thickness (or flying height), and the speed of the disk in inches per second. As shown therein, both drag and flying height increase only very slightly in accordance with the increase in speed of the disk. Flying height, in general, is less sensitive to changes in speed than drag. The measurements were taken for a three-pad slider loaded with 5 grams, with two ramped pads in front and one 2.5 mil×2.5 mil pad in the rear. As shown therein, the crosses (+) represent the slider drag in grams, while the circles (o) represent the core pad liquid bearing thickness in $\mu$". As shown therein, the drag increases, but the pad flying height is relatively independent of speed.

Other factors which may be incorporated into head design to alter the respective flying heights of the respective pads are the amount of load on the head by the suspension, the location at which the load is applied to the head, the length between the front and rear pads, and the use of different bearing liquids.

As noted above, a three-pad head has less drag than the four-pad head in that only one non-ramped pad at the rear is flying at a low flying height within the fluid and thus contributing significantly to the total drag of the head. Further, three pads are the minimum necessary to allow the pads to be pressed against the disk surface and assume an orientation nearly parallel to the disk surface owing to the flexing of the gimbal. This makes it easier to orient the active pad of the three-pad head in a parallel relationship relative to the disk surface. Although the front pads are flying at a significantly higher flying height than the rear pad, because of the length between the front and rear pads, a change in the respective flying heights between the front and rear pads does not significantly alter the relationship of the gap with respect to the disk.

While the foregoing discussion has assumed that the liquid bearing can comprise either a Newtonian or a non-Newtonian bearing, it will be appreciated by those skilled in the art that the advantages attenuant with using the above-defined head designs with a non-Newtonian bearing provide significant advantages over using this design with the Newtonian bearing. Specifically, as shown in FIG. 3, because the viscosity of a non-Newtonian liquid decreases with respect to that of a Newtonian fluid as the shear rate increases, the higher shear rates which are caused by the lower flying pad will allow the flying height of the lower flying pad to be maintained while drag is minimized. It should also be noted that a significantly low level of fluid is required for operation of the head. Specifically, the level of bearing lubricant need only be maintained at the desired flying height level $h_1$ of the highest pad of the slider, e.g., 6–10$\mu$". This level is substantially lower than, for example, that shown in European Publication Number 0 367 510.

FIGS. 14A–14D show the process steps utilized to manufacture a four-pad head in accordance with the present invention. It will be realized by those skilled in the art that the description with respect to the four-pad head may be readily adapted to manufacture a three- or two-pad head in accordance with the present invention. Again, it should be realized that FIGS. 14A–14D are not drawn to scale. FIG. 14A is a bottom view of a conventional slider with two rails 80 and 82 formed in the base of the slider in a conventional manner. The head has been lapped to create the best surface finish and pole tip recession possible. Rails 80 and 82 are generally the same size as an air bearing slider, hence a conventional lapping process generally used with air bearing sliders may be utilized at this stage of manufacture.

Rails 80 and 82 are thereafter etched by conventional pattern etching techniques to create a step 84 in rails 80 and 82. Step 84 lowers the etched surface approximately 50 to 100$\mu$" below the surrounding material which will eventually define the pad areas. The raised area 80a and 82a, of rails 80 and 82, respectively, is provided with the final intended path width, approximately 2 mils. Since the extended raised portions 80a and 82a extend the entire length of the slider, and off the ends of the slider, mask alignment along the length of the head is not a problem. Lateral alignment is not critical and the conventional transverse pressure contour (TPC) head tooling is in place to perform this function. Conventional etching processes such as ion milling can create some redeposited material during etching, thus it may be necessary to briefly lap the slider after milling to remove redeposited material. The process would be somewhat easier with rails extending the length of the slider because the area is bigger and loads can be greater. It is actually not necessary that step 84 be created along the length of each rail, but only at those areas where the pads will eventually be formed.

FIG. 14D is a cross-sectional view of FIG. 14C, both of which show how the center portion 85 of the slider body is removed by a dicing process to define the front edges of the rear pads and the rear edges of the front pads. This process has several advantages. Namely, experience has shown that a diced edge will function well at the critical leading edge of the rear pad. It is not desireable to create a blend at the leading edge of the rear pad. Conventional lapping processes that have been performed on the rear pad after it was made to final size, generally 2 by 3 mils, run a risk of putting a tiny blend on the front edge that would cause the rear pad to fly at a much higher level. In addition, the dicing process will generally define the lengths of the pads much more than etching. The present state-of-the-art in etching mask alignment allows the pad to be positioned along the length of the slider at a position of plus or minus 0.5 mils.

Although etching generally creates some blend on the outside edges of the pads, as long as the leading edge of the pad is created without a blend, the slider will function properly. A blend at the outside edges of the slider would probably confer some greater resistance to the head scratching the disk during crash stop when, in general the actuator arm engages a crash stop and inertial forces causes the head to yaw as the disk slows and the head settles to the disk surface. In such cases a "sharp" edge contributes more damage than the blended edge. Such a blend would not really affect slider performance as long as the blend area was small compared to the pad area, and its angle is much bigger than the approximately 1° shown to cause lift.

The ramped leading edge of the pads may thereafter be provided by lapping the front edges of the leading edge pads. Alternatively, the lapping may be performed before or after the etching step. It is also conceivable that the etching step may be utilized to create the forward ramps, however greater care in mask alignment must be taken, and a "kiss" lapp to remove residue will likely be required.

It has been determined that the core pad can be exquisitely sensitive to blends on the front edge of the core pad. The very fine finishes on the pads are generally made by a succession of lapping processes that go to finer and finer grit sizes. This art is well known in the industry, as is the fact that the edges of surfaces polished in this way will generally have some degree of roll-off or blending, as it is called. This can be minimized by proper technique, but there will always be some edge effect.

A group of three-pad heads was tested that were made by first defining the pad, typically 2.5 mils wide and 3.0 mils long, and second by performing a final polish on the pads, consistent with state of the art practices in the industry, with the intention of minimizing any edge blend. These were three-pad heads very similar to the head shown in FIG. 6A–6C. Tests at 340 ips showed an average drag of 0.65 grams and an average PW50 of 52 ns. The front edges of the core pads were then redefined by dicing away approximately 0.2 mils to make the core pads approximately 2.8 mils long. The pad surface was protected by wax from any erosion by the dicing wheel slurry during this process. This change in length is insignificant compared to the length of 3 mils, but this re-dicing would remove any blend on this edge. The sliders were remounted and tests then showed an average drag of 0.9 grams and a PW50 of 47 ns; showing the heads were clearly flying significantly lower. Attempts to observe this blend directly have shown very mixed results with the interferometer type instruments and with a state of the art atomic force microscope. Nevertheless, the tests described here, and many similar tests we have run, suggest strongly that such blends exist and significantly effect the slider performance. Furthermore, this suggests minimal blends on front pads would be successful in achieving the objects of the invention. However, there is no particular penalty for making the front pads too large.

From a processing perspective, etching is a superior method of defining the pad edges. The etched pat blends on the sides of the pads have not been any problem, but they could be if they were more effective at creating lift. This is because in a typical disk drive, the head is moved radially by a rotary actuator and is always operating at some skew angle with respect to the disk motion vector. The skew angle can be as much as 15°. If the sides of the pads have any tendency to create lift, then they would start to do so as the skew angle gets bigger and a disk velocity component perpendicular to the pad side develops. Etched heads tested with blends due to etching vary widely in shape, being somewhat rounded, but blends are approximately between 10 and 30° and between 20 and 75µ" long. Such blends on the side of the core pad had little effect at up to a 15° skew angle.

Shown in FIG. 15 is a head disk assembly and disk drive configuration which may be used advantageously with the head design described above. As shown therein, head disk assembly 100 generally includes disk 110, actuator assembly 120, header assembly 130, all mounted in a base 105 which, when coupled to cover 107, provides a controlled environment in which the disk 110, actuator assembly 120, and header assembly 130 are maintained. The controlled environment between cover 107 and base 105 allows for a maintenance of a liquid bearing on the disk surface. A wicking assembly 140 transports liquid bearing material to the disk surface while disk 110 is rotating to ensure constant lubrication of the surface for slider 70. Slider 70 is carried by an actuator arm 124 which is part of actuator assembly 120. Actuator assembly 120 includes a voice coil motor which, under the control electronics located on printed circuit board 150, operates responsive to control signals from the host computer to position the head at various data locations on the disk. A spindle motor (not shown) is also located on base 105 and within the controlled environment to rotate disk 110 responsive to control signals from the control electronics on PCB 150.

The many features and advantages of the head design of the present invention will be appreciated by those skilled in the art. The scope of the invention is not intended to be limited to the particular embodiments described herein. These features and advantages are intended to be within the context of the invention as defined in the instant specification, including the detailed description, the drawings and the claims.

What is claimed is:

1. A read/write head for an information recording apparatus, the information recording apparatus comprising a housing, a spin rotator mounted in the housing, a storage disk mounted on the spin rotator, a non-Newtonian liquid bearing lubricant disposed between the storage disk and the read/write head, and means for supporting and positioning the read/write head with respect to said disk to position the read/write head over the storage disk, the head comprising:

a slider body, the slider body having at least a first and second regions; and an interface element, mounted on the first region of the slider body, the interface element comprising a transducer interacting with the storage disk;

wherein upon rotation of the storage disk by the spin rotator, the first region of the slider body supports the slider body at a first distance above the storage disk and exhibits a first shear stress in the non-Newtonian regime on the liquid bearing, and the second region of the slider body supports the slider body at a second distance above the storage disk, the second distance being greater than the first distance such that the second region exhibits a second shear stress in the Newtonian regime, whereby the first region of the slider body has a substantially higher drag than the second region such that the total drag of the slider body is substantially reduced.

2. The read/write head of claim 1 wherein the slider body includes a top and bottom surface, and a first end and a second end, wherein the first region of the slider body includes at least a first pad on the bottom surface at the first end of the slider body, and the second region of the slider body includes at least a second pad on the bottom surface of the slider body at the second end of the slider body.

3. The read/write head of claim 2 wherein the second pad includes a leading edge and a trailing edge, the leading edge preceding the trailing edge over a portion of the storage disk upon rotation of the storage disk, the leading edge being beveled.

4. The read/write head of claim 2 wherein the second end of the slider body includes said second pad, and further includes a third pad, said second and third pads each having a beveled edge oriented to be the leading edge of each said pad with respect to the storage disk relative to the movement of the storage disk when the storage disk is rotated by the spin rotator.

5. The read/write head of claim 1 wherein the head has a mass, and a center of mass positioned at a height above the storage disk, and the actuator includes a suspension element supplying a load to the read/write head with respect to the storage disk, the suspension element being attached to the head such that the attachment is at the height of the center of mass.

6. A recording head for a disk drive, the disk drive including a rotatable storage disk, a spin rotator for supporting and rotating said disk, means for positioning the head relative to said disk, the drive further including a non-Newtonian liquid bearing lubricant on the surface of said disk between said disk and the head, the head comprising:

a slider body, the slider body having a first end and a second end, the first and second ends of the slider body being supported over said disk by said liquid bearing lubricant; and a transducer element, mounted on the first region of the slider body;

wherein upon rotation of said disk by the spin rotator, the first end of the slider body supports the slider body in said liquid bearing lubricant at a first distance from said disk and the second end of the slider body supports the slider body at a second distance from said disk, the second distance being greater than the first distance, such that said first end of the slider body exhibits a greater shear rate on said liquid bearing lubricant than said second end, said shear rate of said first end being in the non-Newtonian regime, and said second end exhibit said shear rate on said liquid bearing in the Newtonian regime, wherein the total drag of the head is reduced.

7. The head of claim 6 wherein the difference in the first distance and the second distance is about 0.1–5.5 micro inches.

8. The head of claim 6 wherein the ratio of the distance between the disk and the second end to the distance between the disk and the first end is between 3:1 and 15:1.

9. The head of claim 6 wherein the first end of the slider body contributes at least 60% of the total drag of the head in the fluid.

10. The head of claim 6 wherein the distance between the disk and the first end is between 0.1 and 1.2 microinches.

11. The head of claim 6 wherein the distance between the disk and the second end is between 1.0 and 7.0 microinches.

12. In a disk drive including a disk, means for rotating the disk, an actuator, swing arm, and a suspension element, and a non-Newtonian liquid lubricant on the disk, a recording head mounted on the suspension element, the actuator arranged to position the recording head with respect to the disk, the recording head comprising:

a body having a bottom surface, the bottom surface having an area, the body having at least a first pad, a second pad and a third pad, each pad supporting the body in the non-Newtonian liquid lubricant when the disk is rotated by the means for rotating, each pad having a bottom surface with an area, the area of the bottom surface of each of said pads being at least one one-thousandth the area of the area of the bottom surface of the body; and a magnetic core and a coil assembly mounted adjacent to said first pad;

wherein, upon rotation of the disk, said second and third pads support the recording head in the non-Newtonian liquid lubricant at a distance from said disk which is in a range of greater than one to about six times greater than a distance between the first pad and the disk such that the shear rate of the first pad is in the non-Newtonian regime and greater than the shear rate of the second and third pads, the shear rate of the second and third pads being in the Newtonian regime, and the drag at said second and third pads is less than the drag at said first pad, such that the total drag of the recording head is reduced.

13. The recording head of claim 12 wherein the body includes a top, a bottom, a leading edge and a trailing edge, and wherein said second and third pads are positioned at the leading edge of the body with respect to the rotation of the disk, and the first pad is positioned at the trailing edge of the body.

14. The head of claim 13 wherein the second and third pads include inclined ramps.

15. A disk drive, comprising:

a disk having a surface;

means for supporting and rotating the disk;

a non-Newtonian liquid bearing on the surface of the disk;

a read/write head having a first head region and a second head region, and a core positioned adjacent to the first head region; and means for positioning side head with respect to the disk, the means cooperating with the non-Newtonian liquid bearing to support the read/write head such that the first head region passes through the non-Newtonian liquid bearing when the disk is rotating and exhibits shear characteristics in a non-Newtonian regime within the liquid;

the second head region passes through the non-Newtonian liquid bearing when the disk is rotating and exhibits shear characteristics within a Newtonian regime within the non-Newtonian liquid bearing wherein the total drag of the head is reduced.

16. The head of claim 15 wherein the first region includes two pads positioned to support the head in the liquid bearing, and said pads have a beveled leading edge.

17. The head of claim 15 wherein the first region and the second region each include two pads positioned to support the head in the non-Newtonian liquid bearing and said two pads at the first region have a beveled leading edge.

18. The head of claim 15 including two pads positioned at the second region of the head, each pad at the first region including a tapered leading edge, and two pads are positioned at the first region of the head, one of the pads at the second region having a recording gap formed therein, the gap being coupled to the core, the other of the pads at the first region of the head having a tapered leading edge.

* * * * *